(12) United States Patent  
Rowe

(10) Patent No.: US 12,465,548 B2
(45) Date of Patent: Nov. 11, 2025

(54) ARTIFICIAL MUSCLE LIGHT WEIGHT SEAT MASSAGER AND HAPTIC RESPONSE CHAIR

(71) Applicant: Toyota Motor Engineering & Manufacturing North America, Inc., Plano, TX (US)

(72) Inventor: Michael P. Rowe, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1168 days.

(21) Appl. No.: 17/365,267

(22) Filed: Jul. 1, 2021

(65) Prior Publication Data

US 2023/0000715 A1  Jan. 5, 2023

(51) Int. Cl.
*A61H 9/00* (2006.01)
*B60N 2/02* (2006.01)
(Continued)

(52) U.S. Cl.
CPC ......... *A61H 9/0078* (2013.01); *B60N 2/0244* (2013.01); *B60N 2/5642* (2013.01);
(Continued)

(58) Field of Classification Search
CPC .......... A61H 9/0078; A61H 2201/0103; A61H 2201/0149; A61H 2201/1207; A61H 2201/1238; A61H 2201/1409; A61H 2201/5051; A61H 23/04; A61H 9/00; B60N 2/976; B60N 2/0244; B60N 2/5642;
(Continued)

(56) References Cited

U.S. PATENT DOCUMENTS 8,349,150 B2 *  1/2013  Sugahara ............. H02N 11/006
                     310/11
8,998,320 B2 *  4/2015  Mankame ............ B60N 2/0024
                     297/284.11

(Continued)

FOREIGN PATENT DOCUMENTS

CN     204233403 U   4/2015
CN     209812321 U   12/2019
(Continued)

OTHER PUBLICATIONS

Machine translation of written description and claims for WO2020241387A1 via espacenet. (Year: 2020).*

(Continued)

*Primary Examiner* — Timothy A Stanis
*Assistant Examiner* — Tyler A Raubenstraw
(74) *Attorney, Agent, or Firm* — Dinsmore & Shohl LLP

(57) ABSTRACT

An artificial muscle chair device includes a plurality of artificial muscles embedded in a chair. Each artificial muscle includes a housing having an electrode region and an expandable fluid region. A first electrode and a second electrode each disposed in the electrode region of the housing. The artificial muscle chair device further includes a dielectric fluid disposed within the housing. The first and second electrodes electrostatically attract, inflating the expandable fluid region with dielectric fluid and thereby applying selective pressure to an outer surface of the chair.

20 Claims, 16 Drawing Sheets

(51) Int. Cl.
   *B60N 2/56*     (2006.01)
   *B60N 2/90*     (2018.01)
(52) U.S. Cl.
   CPC ...... *B60N 2/976* (2018.02); *A61H 2201/0103* (2013.01); *A61H 2201/0149* (2013.01); *A61H 2201/1207* (2013.01); *A61H 2201/1238* (2013.01)
(58) Field of Classification Search
   CPC ...... B60N 2/90; B60N 2/7035; B60N 2/0722; B60N 2/0735; B60N 2/08; B60N 2/22; B60N 2/686; H02N 1/002; H02N 1/006; H01B 3/20
   See application file for complete search history.

(56) References Cited

U.S. PATENT DOCUMENTS

| | | | | |
|---|---|---|---|---|
| 10,677,310 | B2* | 6/2020 | Gandhi | F16F 15/06 |
| 10,682,903 | B1* | 6/2020 | Gandhi | B60J 10/70 |
| 10,859,101 | B2* | 12/2020 | Rowe | F15B 15/088 |
| 11,372,481 | B2* | 6/2022 | Leroy | G06F 3/016 |
| 2005/0200238 | A1* | 9/2005 | Park | H02N 11/006 310/328 |
| 2006/0074325 | A1* | 4/2006 | Karo | A61B 5/022 600/494 |
| 2007/0084220 | A1 | 4/2007 | Asada et al. | |
| 2009/0129952 | A1* | 5/2009 | Patrascu | F04B 43/046 417/322 |
| 2011/0054366 | A1 | 3/2011 | Smith et al. | |
| 2012/0212907 | A1* | 8/2012 | Dede | H01L 23/4735 361/689 |
| 2014/0015293 | A1 | 1/2014 | Pellenz et al. | |
| 2014/0175941 | A1* | 6/2014 | Johnson | H02N 1/006 310/309 |
| 2014/0346823 | A1* | 11/2014 | Stebbins | B60Q 9/008 297/217.1 |
| 2017/0136926 | A1* | 5/2017 | Dry | B60N 2/5664 |
| 2018/0205327 | A1* | 7/2018 | Wu | H02N 1/04 |
| 2019/0092204 | A1* | 3/2019 | Mergl | B60N 2/0027 |
| 2020/0079245 | A1* | 3/2020 | Rowe | B60N 2/0248 |
| 2020/0130321 | A1* | 4/2020 | Gandhi | B32B 3/08 |
| 2020/0241683 | A1* | 7/2020 | Le | A61H 15/0078 |
| 2020/0324675 | A1* | 10/2020 | Yamamoto | B60N 2/0027 |
| 2021/0169730 | A1* | 6/2021 | Son | A61H 9/0078 |
| 2021/0316446 | A1* | 10/2021 | Leroy | G06F 3/014 |
| 2021/0323467 | A1* | 10/2021 | Richardson | B60N 2/002 |
| 2022/0216808 | A1* | 7/2022 | Kedzierski | H02N 1/004 |
| 2022/0255463 | A1* | 8/2022 | Bekker | H02N 1/006 |
| 2022/0378651 | A1* | 12/2022 | Palacio | B60N 2/976 |

FOREIGN PATENT DOCUMENTS

| | | | | |
|---|---|---|---|---|
| DE | 102016217124 | A1 | 3/2018 | |
| DE | 102019004095 | A1 | 12/2020 | |
| JP | 7-213577 | A | 8/1995 | |
| JP | 2005230957 | A | 9/2005 | |
| KR | 20190084914 | A | 7/2019 | |
| WO | 2007056640 | A2 | 5/2007 | |
| WO | 2012007860 | A1 | 1/2012 | |
| WO | 2012130898 | A1 | 10/2012 | |
| WO | 2014012439 | A1 | 1/2014 | |
| WO | 2015024837 | A1 | 2/2015 | |
| WO | 2015148223 | A1 | 10/2015 | |
| WO | 2019173227 | A1 | 9/2019 | |
| WO | WO-2020241387 | A1 * | 12/2020 | ............ B32B 33/00 |
| WO | WO-2023078563 | A1 * | 5/2023 | ............ A61H 11/00 |

OTHER PUBLICATIONS

E. Acome, et al., "Hydraulically Amplified Self-Healing Electrostatic Actuators With Muscle-Like Performance," Science Journal, Jan. 5, 2018: vol. 359, Issue 6371, pp. 61-651, Department of Mechanical Engineering & Materials Science and Engineering Program, University of Colorado, Boulder, CO 80309, USA.

* cited by examiner

ARTIFICIAL MUSCLE LIGHT WEIGHT SEAT MASSAGER AND HAPTIC RESPONSE CHAIR

TECHNICAL FIELD

The present specification generally relates to artificial muscles and, in particular, to artificial muscles that provide massage and haptic response capabilities to users seated in chairs.

BACKGROUND

Users have long benefitted from massage and the benefits it provides, such as muscle-loosening and/or reducing/eliminating pain, tension, and/or stress reduction. In recent years, users have been able to receive machine-based massage in chairs. However, such chairs utilize conventional actuators, which tend to be heavy and power-consuming. Thus, employing conventional actuators is impractical in situations where weight and/or power consumption reduction are priorities.

Accordingly, there exists a need to provide improved massage and haptic feedback to users seated in chairs.

SUMMARY

In one embodiment, an artificial muscle chair device includes a plurality of artificial muscles embedded in a chair. Each artificial muscle includes a housing having an electrode region and an expandable fluid region. A first electrode and a second electrode each disposed in the electrode region of the housing. The artificial muscle chair device further includes a dielectric fluid disposed within the housing. The first and second electrodes electrostatically attract, inflating the expandable fluid region with dielectric fluid and thereby applying selective pressure to an outer surface of the chair.

In another embodiment, a method for actuating an artificial muscle chair device includes providing a voltage using a power supply electrically coupled to an electrode pair of each of a plurality of artificial muscles in a chair. Each artificial muscle includes a housing having an electrode region and an expandable fluid region, a first electrode and a second electrode each disposed in the electrode region of the housing, and a dielectric fluid disposed within the housing. The method also includes electrostatically attracting via the first and second electrodes, inflating the expandable fluid region with the dielectric fluid, and applying selective pressure to an outer surface of the chair.

In a further embodiment, an artificial muscle vehicle chair device includes a plurality of artificial muscles embedded in a chair. Each artificial muscle includes a housing having an electrode region and an expandable fluid region, along with a first electrode and a second electrode each disposed in the electrode region of the housing. The artificial muscle vehicle chair device further includes dielectric fluid disposed within the housing, where the first and second electrodes are configured to electrostatically attract, inflating the expandable fluid region with the dielectric fluid and thereby applying selective pressure to the chair, wherein at least two of the plurality of artificial muscles are in different states of actuation at the same time. The artificial muscle vehicle chair device additionally includes a plurality of independently operable layered actuation structures each comprising one or more actuation platforms interleaved with one or more mounting platforms to form one or more actuation cavities therebetween, wherein at least one of the plurality of artificial muscles is disposed in the one or more actuation cavities and the plurality of independently operable layered actuation structures are embedded in the chair. The artificial muscle vehicle chair device also includes a controller to which the plurality of artificial muscles are communicatively coupled. The controller is configured to provide output to the plurality of artificial muscles to provide haptic feedback to an occupant of the artificial muscle chair device, wherein the artificial muscle vehicle chair device resides in a vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
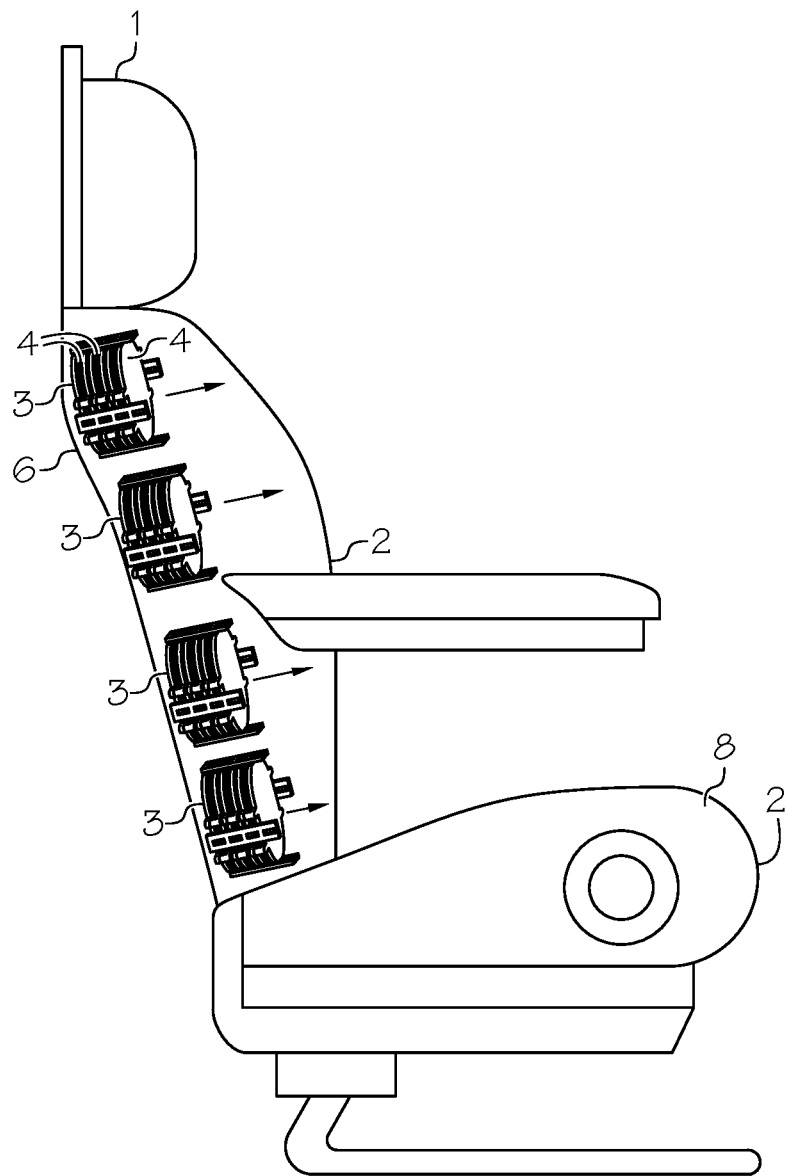
FIG. 1A schematically depicts a side view of a chair with layered actuation structures disposed within, according to one or more embodiments shown and described herein.

Embodiments described herein are directed to artificial muscle chair devices that include artificial muscles configured to apply pressure to an occupant of a chair. The artificial muscles are more lightweight than traditional motors or actuators, making them better-suited than traditional motors for use in vehicles for a variety of reasons such as vehicle handling and fuel economy, for example. The artificial muscle chair devices described herein may include layered actuation structures having actuation platforms interleaved with mounting platforms to form actuation cavities therebetween. The artificial muscle chair devices described herein may include artificial muscles embedded in a chair, where each artificial muscle comprises a housing having an electrode region and an expandable fluid region, a first electrode and a second electrode each disposed in the electrode region of the housing. A dielectric fluid may be disposed within the housing, where the first and second electrodes may electrostatically attract, inflating the expandable fluid region with dielectric fluid and thereby applying selective pressure to the chair. Artificial muscles, whether individually or collectively, may then provide a variety of beneficial types of pressure, such as massaging patterns of pressure, and/or haptic feedback based upon occupant input, vehicle operation, and/or as output from an infotainment device. Various embodiments of the artificial muscle chair devices and the operation of which, are described in more detail herein. Whenever possible, the same reference numerals will be used throughout the drawings to refer to the same or like parts.

Figure 1B:
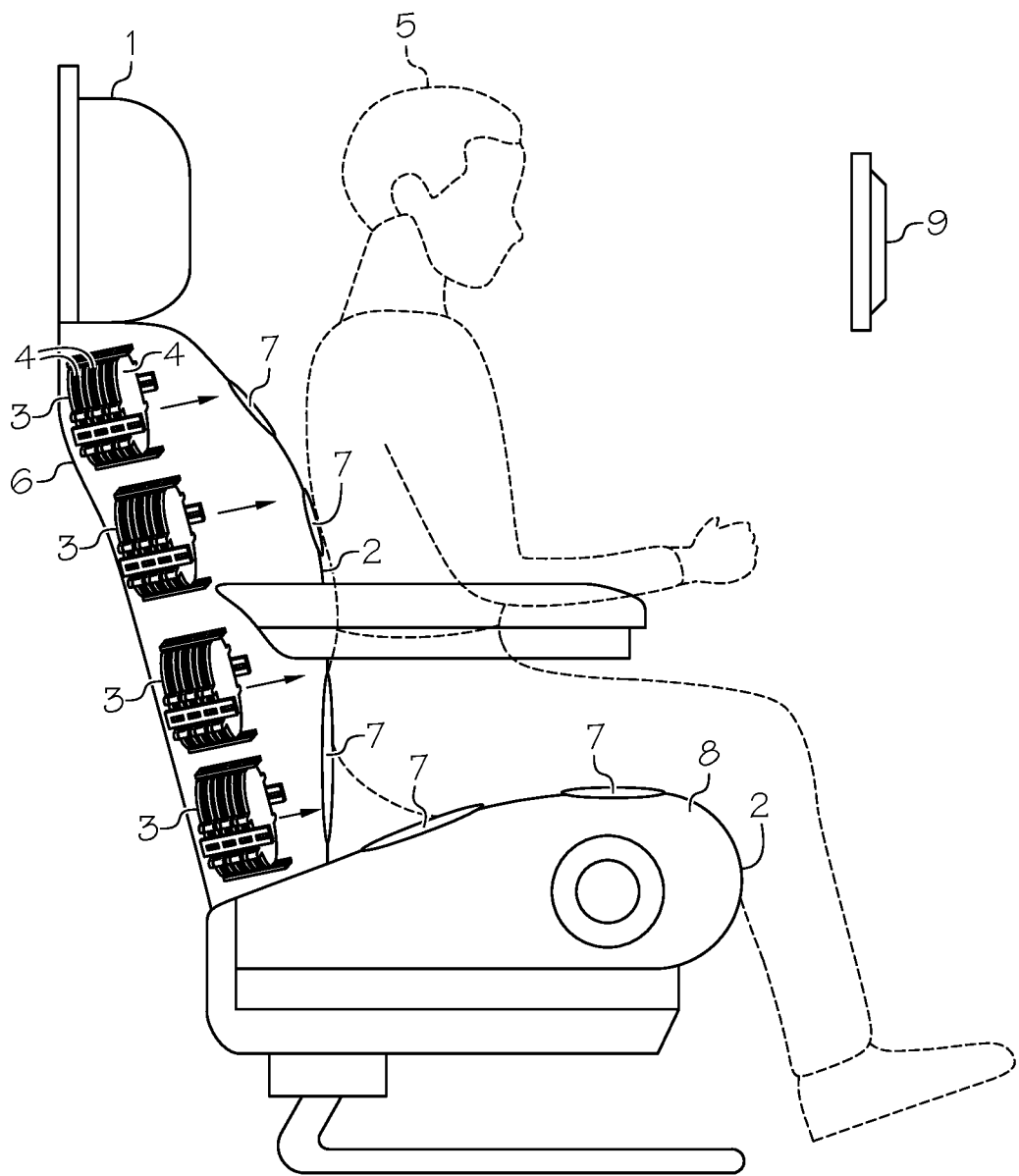
FIG. 1B schematically depicts a side view of the chair of FIG. 1A having an occupant and heating elements, along with a screen disposed in front of the chair occupant, according to one or more embodiments shown and described herein.

Referring now to FIGS. 1A-1B, an artificial muscle chair device 1 is schematically depicted as having a plurality of layered actuation structures 3, each having a plurality of artificial muscles 4. In FIG. 1A, the pressure exerted by actuation of the layered actuation structures 3 and the constituent artificial muscles 4 upon one or more outer surfaces 2 of the artificial muscle chair device 1 is represented by the arrows extending through the seatback 6 of the artificial muscle chair device 1. In some embodiments, a subset of the available layered actuation structures 3 may be activated while others are not. In some embodiments, a subset of artificial muscles 4 may be activated within a layered actuation structure 3, while other artificial muscles 4 within the same layered actuation structure 3 may not be activated/utilized at that time. In this way, the layered actuation structures 3 may apply selective pressure to one or more outer surfaces 2 of the artificial muscle chair device 1.

In some embodiments, layered actuation structures may be independently operable with respect to other layered actuation structures. In other embodiments, layered actuation structures 3 and the constituent artificial muscles 4 may be present in any other suitable portion of the artificial muscle chair device 1, such as the seat cushion, arm rest, a foot rest, or any other portion which may have contact with an occupant. As used herein, the terms "occupant" and "user" may be used interchangeably. In other embodiments, artificial muscles 4 without actuation structures may be utilized in other arrangements such as artificial muscle stacks or artificial muscles individually applying pressure to an occupant without being vertically engaged with other artificial muscles. Any artificial muscle 4 may actuate/de-actuate in unison or at different rates, intervals, intensity, and the like, with respect to any other artificial muscle. In this way, any type of pressure pattern can be applied, such as changing pressure and location, which may be utilized for massaging pressure such as rippling pressure and/or waves of pressure. In this embodiment, the artificial muscle chair device 1 may reside within a vehicle (car, truck, sport utility vehicle, van, motorcycle, aircraft, boat, ship, submersible craft, spacecraft, and the like). In other embodiments, the artificial muscle chair device 1 may be located outside of a vehicle, such as house, office, or patio furniture.

Turning to FIG. 1B, an occupant 5 is seated in the artificial muscle chair device 1 and receiving pressure through the portion of the outer surface 2 disposed on the seatback 6 from the layered actuation structures 3. In this embodiment, the artificial muscle chair device 1 may include one or more heating elements 7 in the seatback 6 and seat cushion 8 to provide warmth. Any suitable type of heating element 7 may be utilized such as an insulated wire, carbon fiber, and the like. In some embodiments, one or more cooling elements (seat ventilation via one or more built in fans, air conditioning via a compressor, condenser, and the like) may be present with or without heating elements 7, in any suitable configuration(s).

A screen 9 of an infotainment system/device is depicted as being viewed by the occupant 5. Any suitable type of device and/or content may be utilized, such as (by way of non-limiting examples) television, streaming or internet content, gaming, navigation, vehicle operation, and the like. The occupant 5 may provide input to the screen 9 via input buttons on the artificial muscle chair device 1, via the screen 9 if it is a touch screen, gaze tracking, gesture tracking, gaming controller, remote control, smartphone, table, laptop, and the like. As discussed further herein, output from the infotainment system may be provided to the artificial muscle chair device 1 such that the occupant 5 can receive the output as haptic feedback. For example, events in a video game or movie can result in certain types of pressurized feedback through the artificial muscle chair device 1. If the occupant 5 is operating a vehicle (or is a passenger), haptic feedback may be provided through the artificial muscle chair device 1 for a variety reasons, such as (by way of non-limiting example) driver assistance (lane departure, blind spot detection, speed limit alerts, and the like). As discussed further herein, some embodiments of artificial muscles 4 may utilize a pressure/weight sensor. For example, an artificial muscle chair device 1 for a passenger may not provide haptic feedback unless sufficient weight (such as above a predetermined threshold) is detected by the pressure sensor to indicate that there is an occupant 5 seated in the artificial muscle chair device 1. In another example, haptic feedback may be provided to an occupant 5 based upon operation of the vehicle by the occupant 5. In a further example, varying actuation may be based upon output received at a controller (discussed further with respect to FIG. 14) based upon input received from an occupant 5 and/or the vehicle.

Figure 2A:
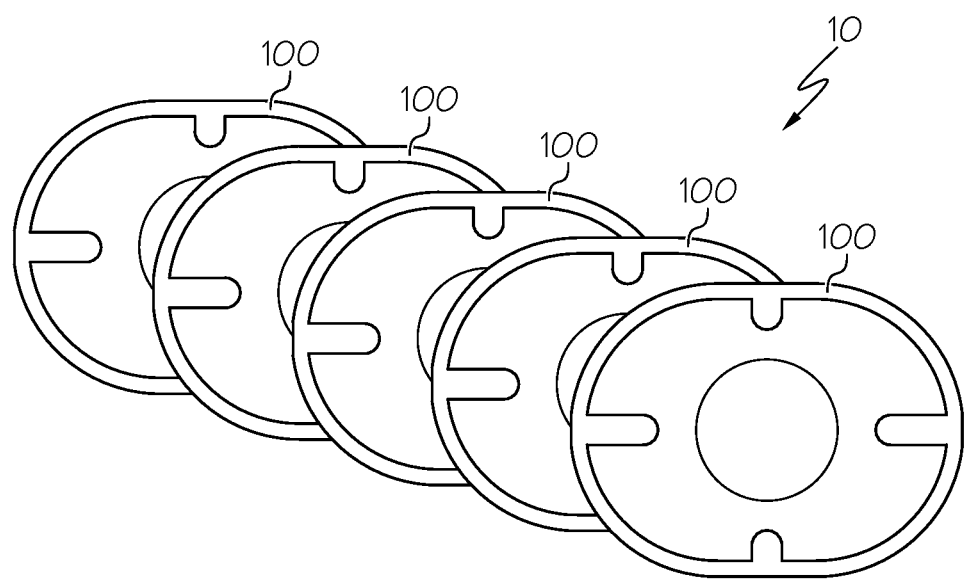
FIG. 2A schematically depicts an exploded view of artificial muscles, according to one or more embodiments shown and described herein.
Figure 2B:
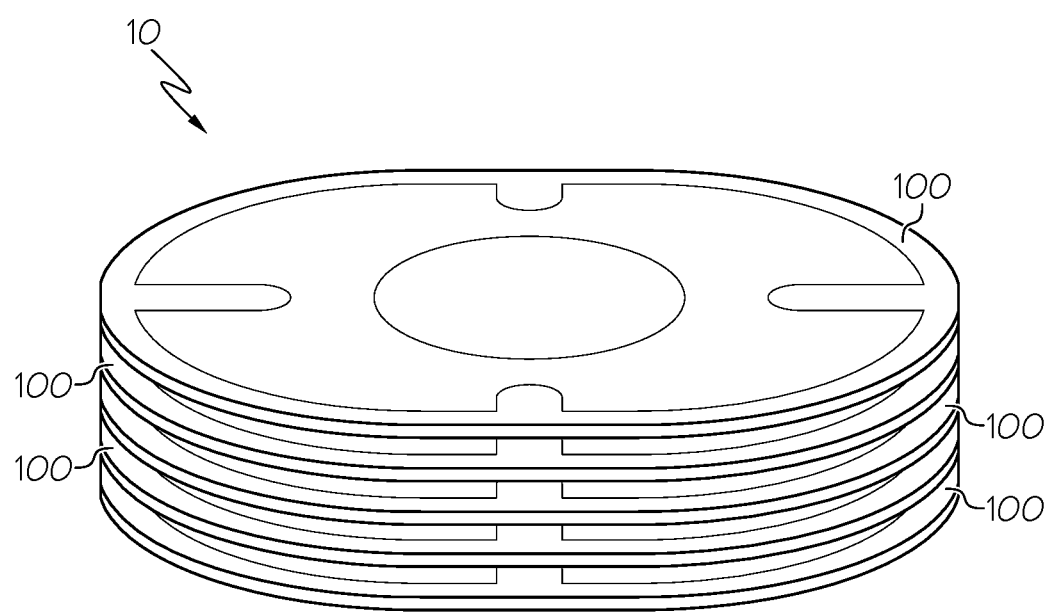
FIG. 2B schematically depicts a perspective view of artificial muscles, according to one or more embodiments shown and described herein.
Figure 2C:
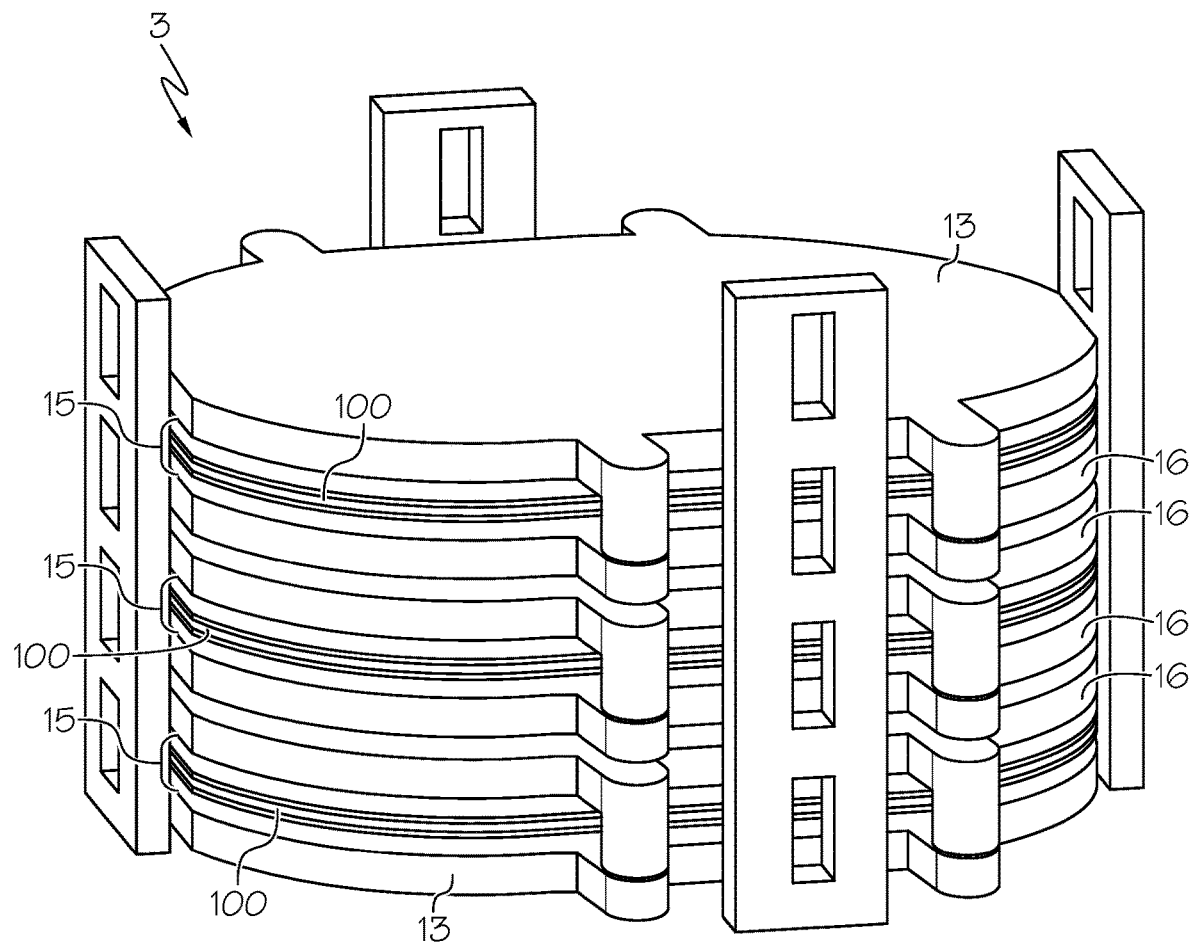
FIG. 2C schematically depicts a layered actuation structure actuation platforms interleaved with mounting platforms to form actuation cavities therebetween to contain artificial muscles, according to one or more embodiments shown and described herein.

Referring now to FIGS. 2A-2C, an artificial muscle group 10 is schematically depicted. Embodiments of the artificial muscle group 10 are depicted as having artificial muscles disposed in an alternating pattern in an exploded view in FIG. 2A and in a non-exploded view in FIG. 2B. As described herein, actuation of the one or more artificial muscles 100 may be used to apply pressure, such as when the artificial muscle group 10 is subjected to weight (i.e., downward pressure). While all artificial muscles 100 may actuate/de-actuate in unison in this embodiment, in other embodiments not all artificial muscles 100 may actuate/de-actuate together.

Referring to FIG. 2C, the artificial muscle group 10 may utilize any suitable type of external structure, such as a layered actuation structure 3 with one or more actuation platforms 16 interleaved with mounting platforms 13 that form actuation cavities 15 therebetween to contain artificial muscles 100. By providing such external structure, the actuation cavities 15 may hold the artificial muscles 100 in place. Artificial muscles 100 may be vertically aligned according to their respective electrode regions 194 and/or expandable fluid regions 196, as described further with respect to FIGS. 4-10.

Moreover, embodiments are contemplated with a plurality of artificial muscles 100 arranged in a single layer within the actuation cavity 15, in contrast to artificial muscle stacks. In operation, the one or more artificial muscles 100 are actuatable to expand and apply a pressure to an inner layer and/or outer layer of the artificial muscle group 10. Actuation of each artificial muscle 100 of the plurality of artificial muscles 100 may be independent and selective to maintain a periodic actuation pressure. In operation, actuation of the one or more artificial muscles 100 may be controlled by an actuation system 1100, which, as described in more detail with respect to FIG. 14, may include components housed in an onboard control unit 40 coupled to (or contained within) the artificial muscle group 10. This may include, for example, utilizing a pressure value (Pa/pascal, PSI, etc.) to determine the actuation amount of the one or more artificial muscles 100.

The plurality of artificial muscles 100 may be arranged in a plurality of artificial muscles stacks. It should be understood that any number of artificial muscles stacks are contemplated. In some embodiments, the expandable fluid region of each artificial muscle 100 of each of the plurality of artificial muscle stacks are coaxially aligned with one another. However, in other embodiments, there may be some offset between the expandable fluid region at least some of the artificial muscles 100 of the plurality of artificial muscles stacks. Moreover, embodiments are contemplated in which the plurality of artificial muscles 100 are arranged in a single layer within the actuation cavity 15.

The one or more artificial muscles 100 each include an electrode pair 104 disposed in a housing 110 together with a dielectric fluid 198 (FIGS. 3-9). The electrode pair 104 is disposed in an electrode region 194 of the housing 110, adjacent an expandable fluid region 196. In operation, voltage may be applied to the electrode pair 104, drawing the electrode pair 104 together, which directs dielectric fluid into the expandable fluid region 196, expanding the expandable fluid region 196. In FIGS. 2A-2C, one or more artificial muscles 100 are each in a non-actuated state. When the plurality of artificial muscles 100 are not actuated, the actuation cavity 15 comprises a non-actuated thickness $C_N$. When the plurality of artificial muscles 100 are actuated, the actuation cavity 15 comprises an actuated thickness $C_A$. As actuation of the plurality of artificial muscles 100 presses the inner layer inward, the actuated thickness $C_A$ of the actuation cavity 15 is larger than the non-actuated thickness $C_N$ of the actuation cavity 15. While FIGS. 2A-2C show complete non-actuated states of the artificial muscle group 10, it should be understood that each individual artificial muscle 100 and each individual artificial muscle stack may be independently actuated to provide selective pressure.

In some embodiments, each of the one or more artificial muscles 100 are independently actuatable to apply selective pressure within the artificial muscle group 10. In embodiments comprising the plurality of artificial muscle stacks, each artificial muscle stack may be independently actuatable. Moreover, the artificial muscles 100 of a single artificial muscle stack may also be independently actuatable, allowing the displacement stroke applied by a single artificial muscle stack to be altered based on the number of individual artificial muscles 100 of the single artificial muscle stack that are actuated. This facilitates an amount of pressure applied by the artificial muscle group 10. For example, a first artificial muscle stack may be actuated to increase the pressure exerted by an artificial muscle group 10, while a second artificial muscle stack may not be actuated, or actuated to a lesser extent, based upon the amount of pressure needed at a given time. If further pressure becomes necessary, the second artificial muscle stack can be actuated further.

Figure 3:
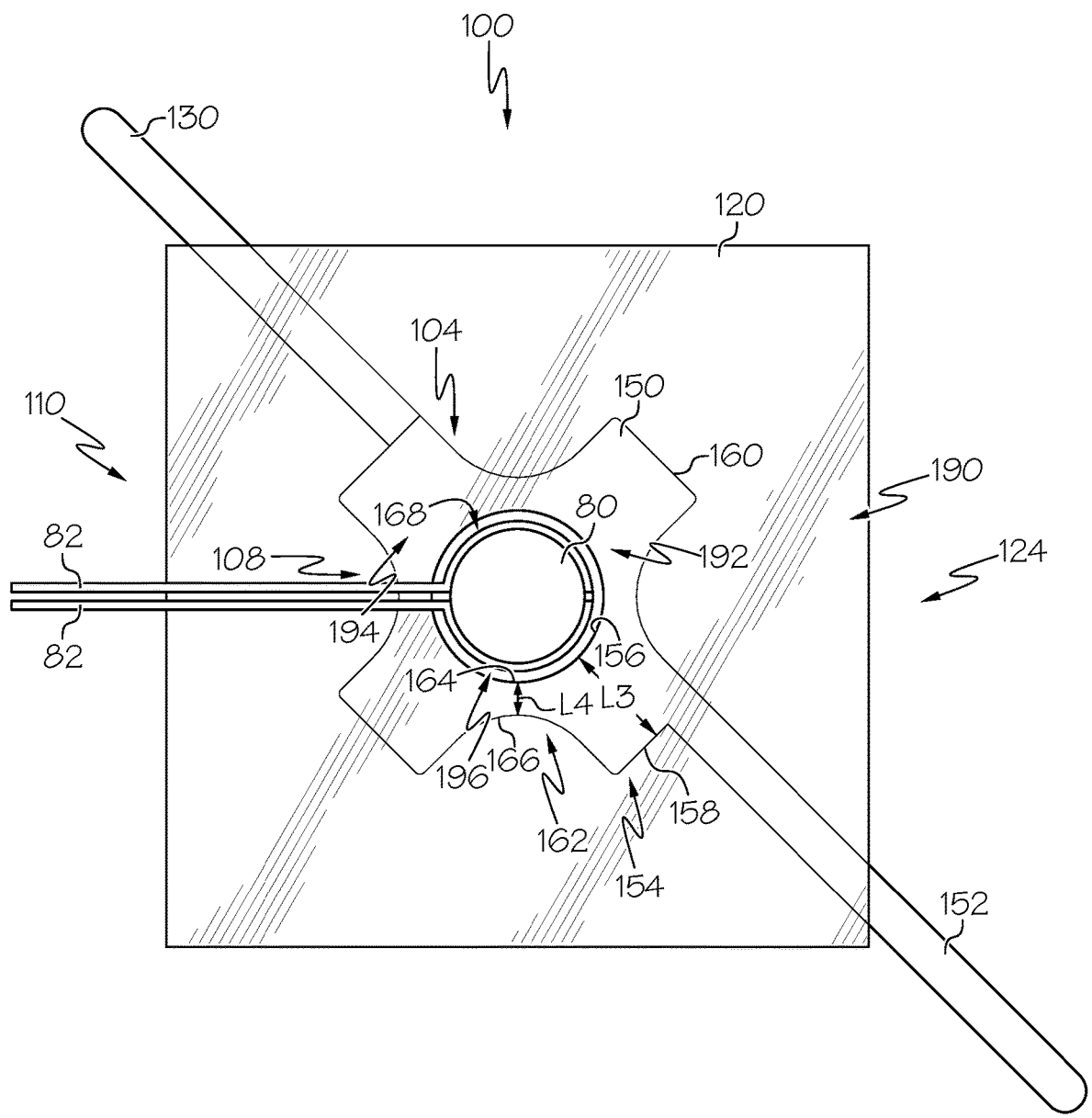
FIG. 3 schematically depicts a top view of an illustrative artificial muscle of the artificial muscle device of FIGS. 2A-2C with a pressure sensor affixed thereon, according to one or more embodiments shown and described herein.
Figure 4:
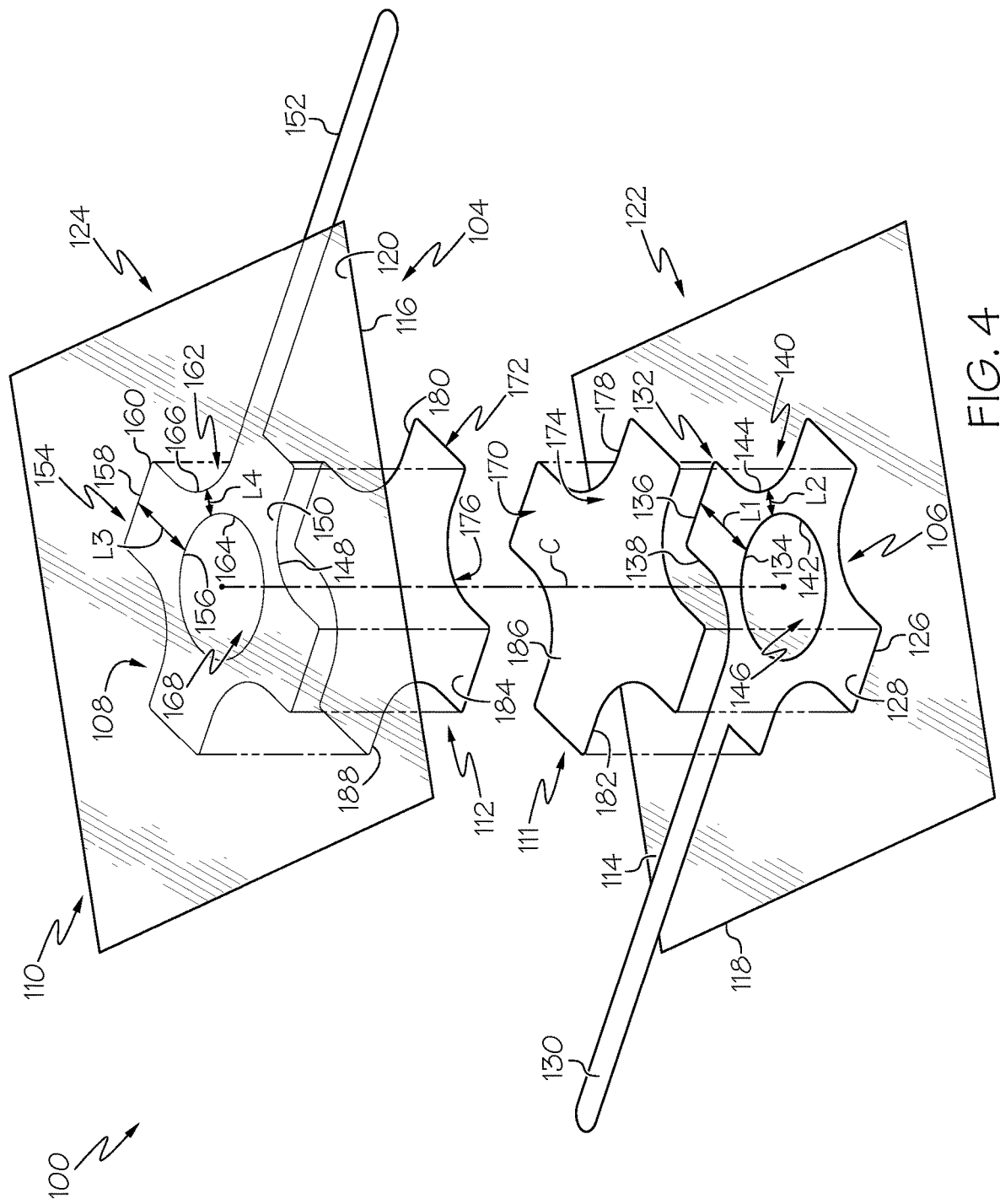
FIG. 4 schematically depicts an exploded view of the artificial muscle of FIG. 3 without the pressure sensor affixed thereon, according to one or more embodiments shown and described herein.
Figure 5:
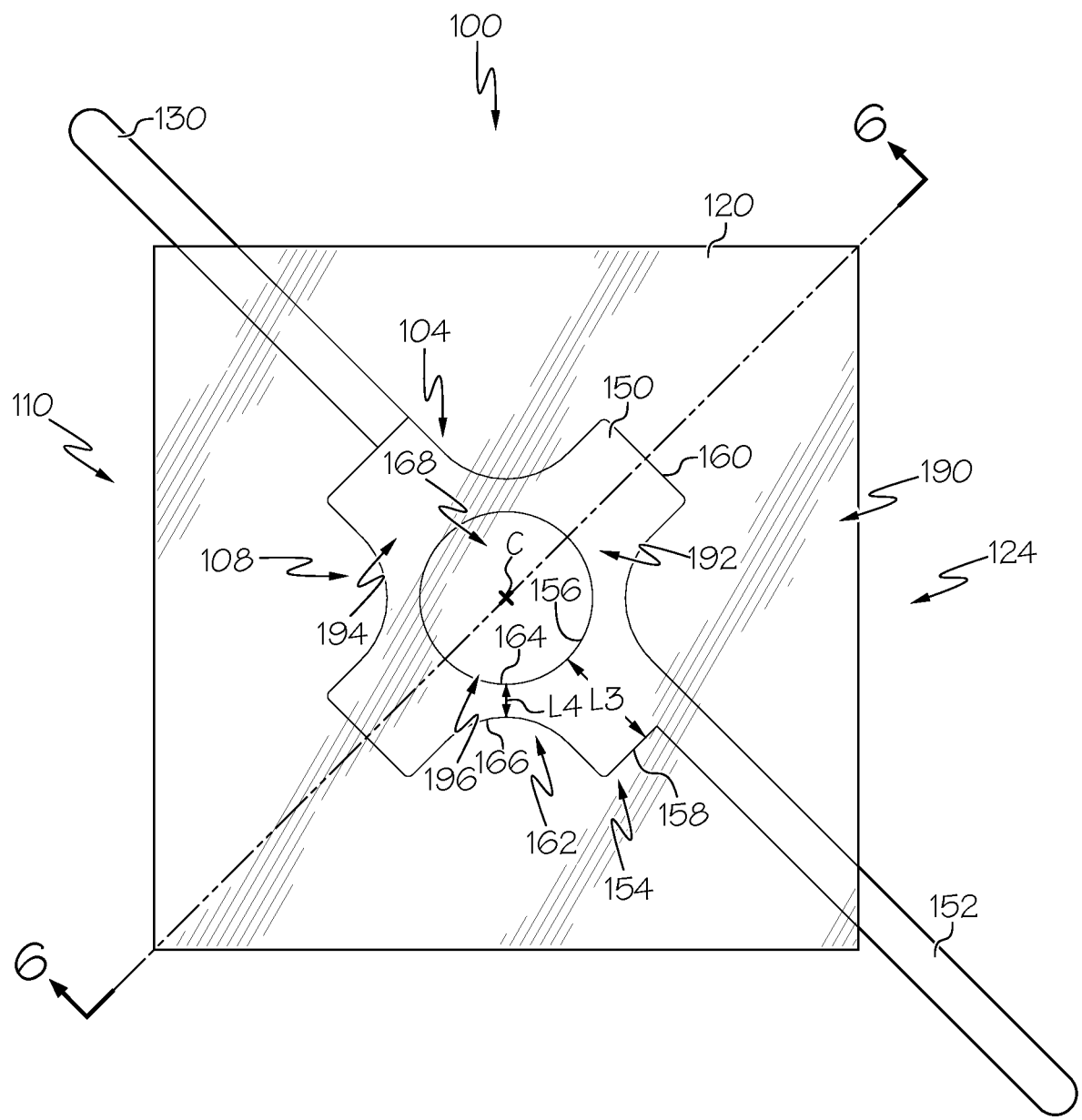
FIG. 5 schematically depicts a top view of the artificial muscle of FIG. 4, according to one or more embodiments shown and described herein.

Referring now to FIGS. 3-5, an example artificial muscle 100 of the artificial muscle group 10 is depicted in more detail. The artificial muscle 100 includes the housing 110, the electrode pair 104, including a first electrode 106 and a second electrode 108, fixed to opposite surfaces of the housing 110, a first electrical insulator layer 111 fixed to the first electrode 106, and a second electrical insulator layer 112 fixed to the second electrode 108. In some embodiments, the housing 110 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 110 are heat-sealable. In other embodiments, the housing 110 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

While the embodiments described herein primarily refer to the housing 110 as comprising the first film layer 122 and the second film layer 124, as opposed to the one-piece housing, it should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 100 is negatively charged.

Figure 14:
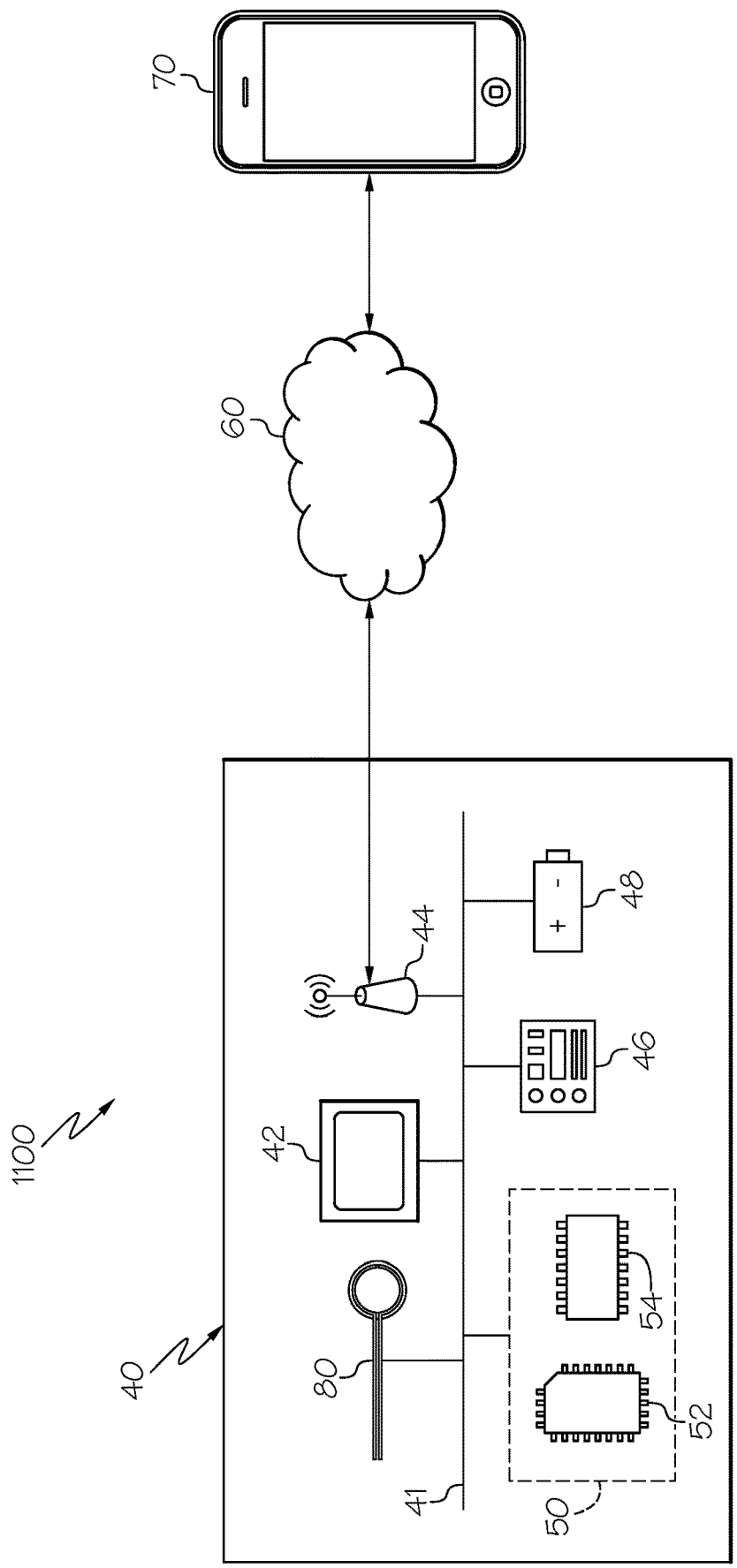
FIG. 14 schematically depicts an actuation system for operating the artificial muscle device of FIGS. 2A-2C and 13A-13B, according to one or more embodiments shown and described herein.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first terminal 130 extending from the first electrode 106 past an edge of the first film layer 122 such that the first terminal 130 can be connected to a power supply to actuate the first electrode 106. Specifically, the terminal is coupled, either directly or in series, to a power supply and a controller of an actuation system 1100, as shown in FIG. 14. Similarly, the second electrode 108 has a film-facing surface 148 and an opposite inner surface 150. The second electrode 108 is positioned against the second film layer 124, specifically, the second inner surface 116 of the second film layer 124. The second electrode 108 includes a second terminal 152 extending from the second electrode 108 past an edge of the second film layer 124 such that the second terminal 152 can be connected to a power supply and a controller of the actuation system 1100 to actuate the second electrode 108.

The first electrode 106 includes two or more tab portions 132 and two or more bridge portions 140. Each bridge portion 140 is positioned between adjacent tab portions 132, interconnecting these adjacent tab portions 132. Each tab portion 132 has a first end 134 extending radially from a center axis C of the first electrode 106 to an opposite second end 136 of the tab portion 132, where the second end 136 defines a portion of an outer perimeter 138 of the first electrode 106. Each bridge portion 140 has a first end 142 extending radially from the center axis C of the first electrode 106 to an opposite second end 144 of the bridge portion 140 defining another portion of the outer perimeter 138 of the first electrode 106. Each tab portion 132 has a tab length L1 and each bridge portion 140 has a bridge length L2 extending in a radial direction from the center axis C of the first electrode 106. The tab length L1 is a distance from the first end 134 to the second end 136 of the tab portion 132 and the bridge length L2 is a distance from the first end 142 to the second end 144 of the bridge portion 140. The tab length L1 of each tab portion 132 is longer than the bridge length L2 of each bridge portion 140. In some embodiments, the bridge length L2 is 20% to 50% of the tab length L1, such as 30% to 40% of the tab length L1.

Figure 6:
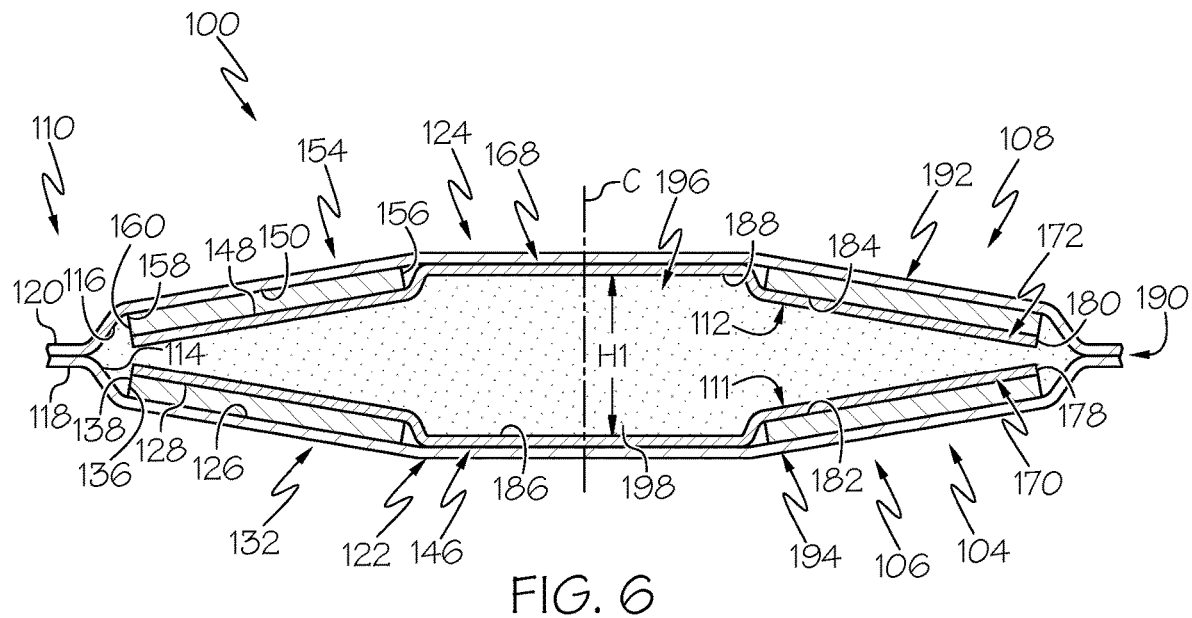
FIG. 6 schematically depicts a cross-sectional view of the artificial muscle of FIG. 4 taken along line 6-6 in FIG. 5 in a non-actuated state, according to one or more embodiments shown and described herein.

In some embodiments, the two or more tab portions 132 are arranged in one or more pairs of tab portions 132. Each pair of tab portions 132 includes two tab portions 132 arranged diametrically opposed to one another. In some embodiments, the first electrode 106 may include only two tab portions 132 positioned on opposite sides or ends of the first electrode 106. In some embodiments, as shown in FIGS. 4-6, the first electrode 106 includes four tab portions 132 and four bridge portions 140 interconnecting adjacent tab portions 132. In this embodiment, the four tab portion 132 are arranged as two pairs of tab portions 132 diametrically opposed to one another. Furthermore, as shown, the first terminal 130 extends from the second end 136 of one of the tab portions 132 and is integrally formed therewith.

Like the first electrode 106, the second electrode 108 includes at least a pair of tab portions 154 and two or more bridge portions 162. Each bridge portion 162 is positioned between adjacent tab portions 154, interconnecting these adjacent tab portions 154. Each tab portion 154 has a first end 156 extending radially from a center axis C of the second electrode 108 to an opposite second end 158 of the tab portion 154, where the second end 158 defines a portion of an outer perimeter 160 of the second electrode 108. Due to the first electrode 106 and the second electrode 108 being coaxial with one another, the center axis C of the first electrode 106 and the second electrode 108 are the same. Each bridge portion 162 has a first end 164 extending radially from the center axis C of the second electrode to an opposite second end 166 of the bridge portion 162 defining another portion of the outer perimeter 160 of the second electrode 108. Each tab portion 154 has a tab length L3 and each bridge portion 162 has a bridge length L4 extending in a radial direction from the center axis C of the second electrode 108. The tab length L3 is a distance from the first end 156 to the second end 158 of the tab portion 154 and the bridge length L4 is a distance from the first end 164 to the second end 166 of the bridge portion 162. The tab length L3 is longer than the bridge length L4 of each bridge portion 162. In some embodiments, the bridge length L4 is 20% to 50% of the tab length L3, such as 30% to 40% of the tab length L3.

In some embodiments, the two or more tab portions 154 are arranged in one or more pairs of tab portions 154. Each pair of tab portions 154 includes two tab portions 154 arranged diametrically opposed to one another. In some embodiments, the second electrode 108 may include only two tab portions 154 positioned on opposite sides or ends of the first electrode 106. In some embodiments, as shown in FIGS. 4-6, the second electrode 108 includes four tab portions 154 and four bridge portions 162 interconnecting adjacent tab portions 154. In this embodiment, the four tab portions 154 are arranged as two pairs of tab portions 154 diametrically opposed to one another. Furthermore, as shown, the second terminal 152 extends from the second end 158 of one of the tab portions 154 and is integrally formed therewith.

Figure 7:
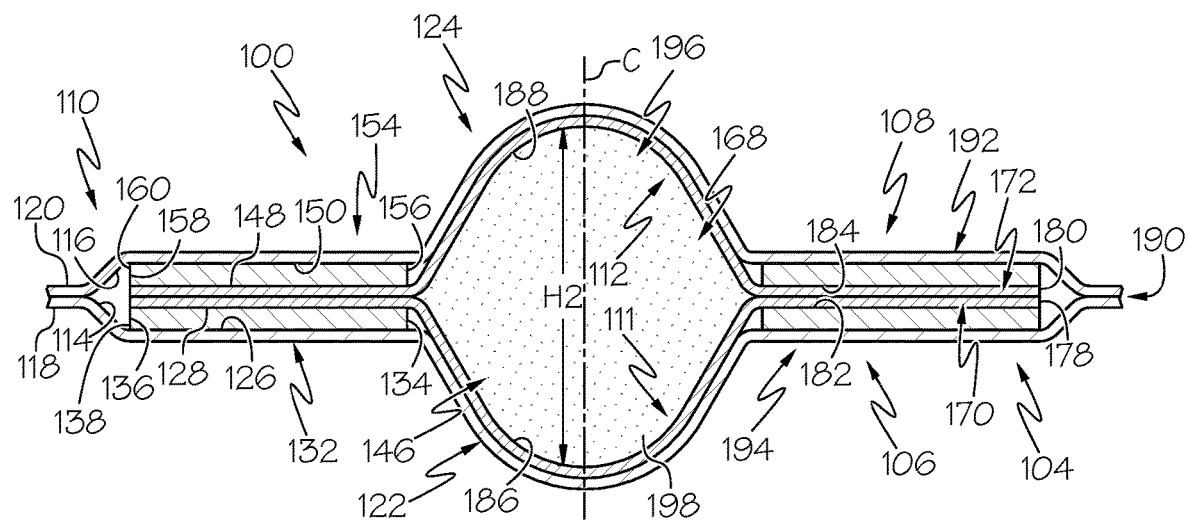
FIG. 7 schematically depicts a cross-sectional view of the artificial muscle of FIG. 4 taken along line 6-6 in FIG. 5 in an actuated state, according to one or more embodiments shown and described herein.
Figure 8:
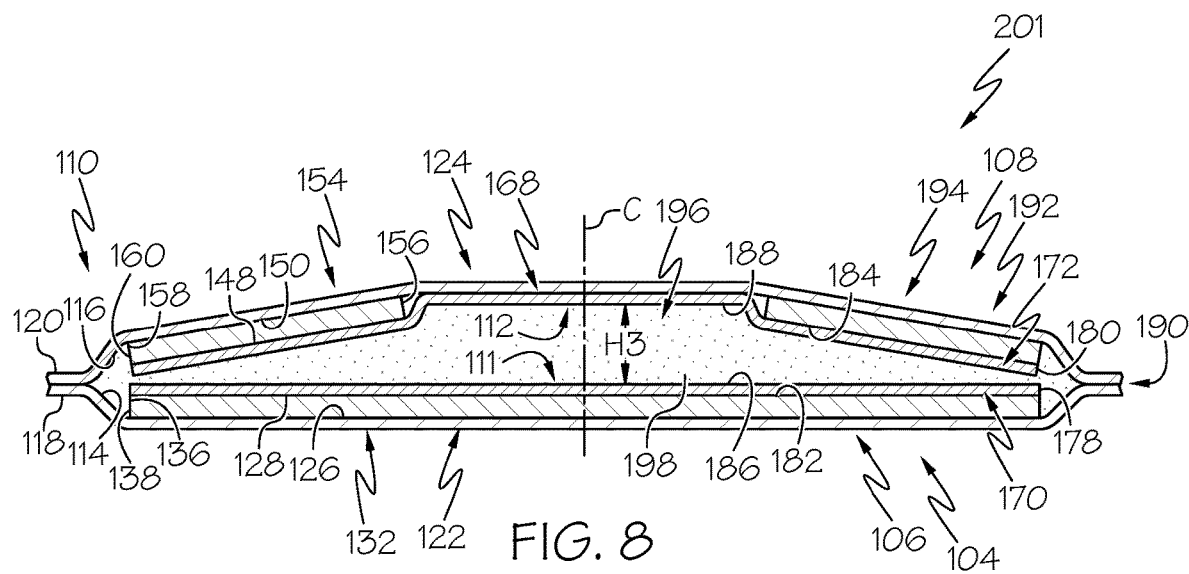
FIG. 8 schematically depicts a cross-sectional view of another illustrative artificial muscle in a non-actuated state, according to one or more embodiments shown and described herein.
Figure 9:
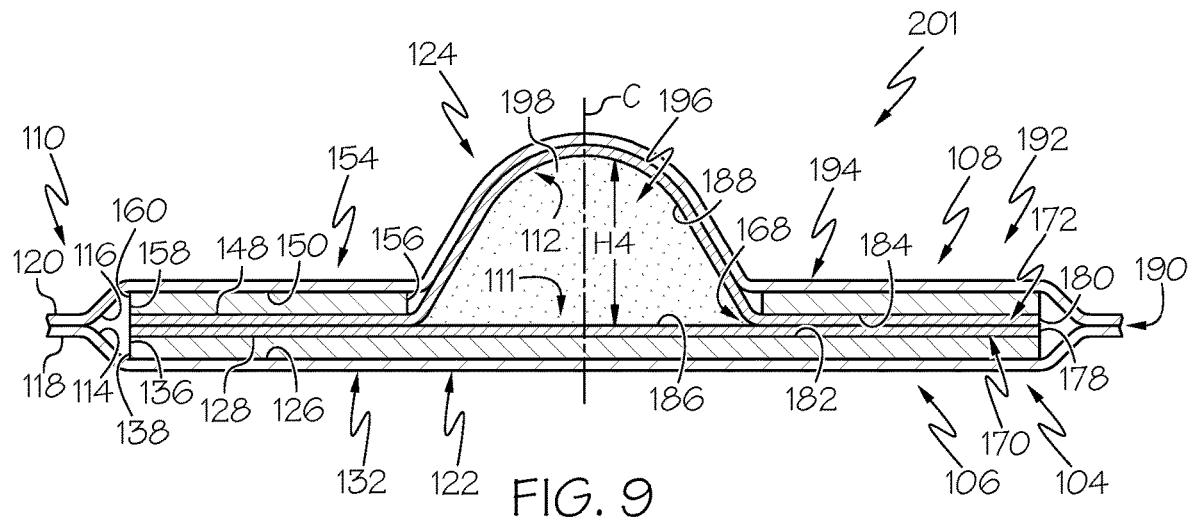
FIG. 9 schematically depicts a cross-sectional view of the artificial muscle of FIG. 4 in an actuated state, according to one or more embodiments shown and described herein.

Referring now to FIGS. 3-9, at least one of the first electrode 106 and the second electrode 108 has a central opening formed therein between the first end 134 of the tab portions 132 and the first end 142 of the bridge portions 140. In FIGS. 6 and 7, the first electrode 106 has a central opening 146. However, it should be understood that the first electrode 106 does not need to include the central opening 146 when a central opening is provided within the second electrode 108, as shown in FIGS. 8 and 9. Alternatively, the second electrode 108 does not need to include the central opening when the central opening 146 is provided within the first electrode 106. Referring to FIGS. 3-9, the first electrical insulator layer 111 and the second electrical insulator layer 112 have a geometry generally corresponding to the first electrode 106 and the second electrode 108, respectively. Thus, the first electrical insulator layer 111 and the second electrical insulator layer 112 each have tab portions 170, 172 and bridge portions 174, 176 corresponding to like portions on the first electrode 106 and the second electrode 108. Further, the first electrical insulator layer 111 and the second electrical insulator layer 112 each have an outer perimeter 178, 180 corresponding to the outer perimeter 138 of the first electrode 106 and the outer perimeter 160 of the second electrode 108, respectively, when positioned thereon.

It should be appreciated that, in some embodiments, the first electrical insulator layer 111 and the second electrical insulator layer 112 generally include the same structure and composition. As such, in some embodiments, the first electrical insulator layer 111 and the second electrical insulator layer 112 each include an adhesive surface 182, 184 and an opposite non-sealable surface 186, 188, respectively. Thus, in some embodiments, the first electrical insulator layer 111 and the second electrical insulator layer 112 are each a polymer tape adhered to the inner surface 128 of the first electrode 106 and the inner surface 150 of the second electrode 108, respectively.

Referring again to FIGS. 3-9, the artificial muscle 100 is shown in its assembled form with the first terminal 130 of the first electrode 106 and the second terminal 152 of the second electrode 108 extending past an outer perimeter of the housing 110, i.e., the first film layer 122 and the second film layer 124. As shown in FIG. 4, the second electrode 108 is stacked on top of the first electrode 106 and, therefore, the first electrode 106, the first film layer 122, and the second film layer 124 are not shown. In its assembled form, the first electrode 106, the second electrode 108, the first electrical insulator layer 111, and the second electrical insulator layer 112 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is heat-sealed to the second film layer 124. Specifically, in some embodiments, the first film layer 122 is sealed to the second film layer 124 to define a sealed portion 190 surrounding the first electrode 106 and the second electrode 108. The first film layer 122 and the second film layer 124 may be sealed in any suitable manner, such as using an adhesive, heat sealing, or the like.

The first electrode 106, the second electrode 108, the first electrical insulator layer 111, and the second electrical insulator layer 112 provide a barrier that prevents the first film layer 122 from sealing to the second film layer 124 forming an unsealed portion 192. The unsealed portion 192 of the housing 110 includes the electrode region 194, in which the electrode pair 104 is provided, and the expandable fluid region 196, which is surrounded by the electrode region 194. The central openings 146, 168 of the first electrode 106 and the second electrode 108 form the expandable fluid region 196 and are arranged to be axially stacked on one another. Although not shown, the housing 110 may be cut to conform to the geometry of the electrode pair 104 and reduce the size of the artificial muscle 100, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 100 using a needle or other suitable injection device.

Referring now to FIGS. 6 and 7, the artificial muscle 100 is actuatable between a non-actuated state and an actuated state. In the non-actuated state, the first electrode 106 and the second electrode 108 are partially spaced apart from one another proximate the central openings 146, 168 thereof and the first end 134, 156 of the tab portions 132, 154. The second end 136, 158 of the tab portions 132, 154 remain in position relative to one another due to the housing 110 being sealed at the outer perimeter 138 of the first electrode 106 and the outer perimeter 160 of the second electrode 108. At least one of the one or more artificial muscles 100 of the artificial muscle group 10 may be in the non-actuated state at a given time. In the actuated state, as shown in FIG. 7, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196. At least one of the one or more artificial muscles 100 of the artificial muscle group 10 may be in the actuated state at a given time.

Referring now to FIG. 6, the artificial muscle 100 is shown in the non-actuated state. The electrode pair 104 is provided within the electrode region 194 of the unsealed portion 192 of the housing 110. The central opening 146 of the first electrode 106 and the central opening 168 of the second electrode 108 are coaxially aligned within the expandable fluid region 196. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the tab portions 132, 154 are brought into contact with one another. Thus, dielectric fluid 198 is provided between the first electrode 106 and the second electrode 108, thereby separating the first end 134, 156 of the tab portions 132, 154 proximate the expandable fluid region 196. Stated another way, a distance between the first end 134 of the tab portion 132 of the first electrode 106 and the first end 156 of the tab portion 154 of the second electrode 108 is greater than a distance between the second end 136 of the tab portion 132 of the first electrode 106 and the second end 158 of the tab portion 154 of the second electrode 108. This results in the electrode pair 104 zippering toward the expandable fluid region 196 when actuated. In some embodiments, the first electrode 106 and the second electrode 108 may be flexible. Thus, as shown in FIG. 5, the first electrode 106 and the second electrode 108 are convex such that the second ends 136, 158 of the tab portions 132, 154 thereof may remain close to one another, but spaced apart from one another proximate the central openings 146, 168. In the non-actuated state, the expandable fluid region 196 has a first height H1.

When actuated, as shown in FIG. 7, the first electrode 106 and the second electrode 108 zipper toward one another from the second ends 144, 158 of the tab portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary.

In order to move the first electrode 106 and the second electrode 108 toward one another, a voltage is applied by a power supply (such as power supply 48 of FIG. 14). In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122 and the first electrical insulator layer 111 to deform in a first axial direction along the center axis C of the first electrode 106 and causes the second film layer 124 and the second electrical insulator layer 112 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state.

It should be appreciated that the present embodiments of the artificial muscle 100 disclosed herein, specifically, the tab portions 132, 154 with the interconnecting bridge portions 174, 176, provide a number of improvements over actuators that do not include the tab portions 132, 154, such as hydraulically amplified self-healing electrostatic (HASEL) actuators described in the paper titled "*Hydraulically amplified self-healing electrostatic actuators with muscle-like performance*" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). Embodiments of the artificial muscle 100 including two pairs of tab portions 132, 154 on each of the first electrode 106 and the second electrode 108, respectively, reduces the overall mass and thickness of the artificial muscle 100, reduces the amount of voltage required during actuation, and decreases the total volume of the artificial muscle 100 without reducing the amount of resulting force after actuation as compared to known HASEL actuators including donut-shaped electrodes having a uniform, radially-extending width. More particularly, the tab portions 132, 154 of the artificial muscle 100 provide zipping fronts that result in increased actuation power by providing localized and uniform hydraulic actuation of the artificial muscle 100 compared to HASEL actuators including donut-shaped electrodes. Specifically, one pair of tab portions 132, 154 provides twice the amount of actuator power per unit volume as compared to donut-shaped HASEL actuators, while two pairs of tab portions 132, 154 provide four times the amount of actuator power per unit volume. The bridge portions 174, 176 interconnecting the tab portions 132, 154 also limit buckling of the tab portions 132, 154 by maintaining the distance between adjacent tab portions 132, 154 during actuation. Because the bridge portions 174, 176 are integrally formed with the tab portions 132, 154, the bridge portions 174, 176 also prevent leakage between the tab portions 132, 154 by eliminating attachment locations that provide an increased risk of rupturing.

In operation, when the artificial muscle 100 is actuated by providing a voltage and applying the voltage to the electrode pair 104 of the artificial muscle 100, expansion of the expandable fluid region 196 produces a force of 3 Newton-millimeters (N·mm) per cubic centimeter ($cm^3$) of actuator volume or greater, such as 4 N·mm per $cm^3$ or greater, 5 N·mm per $cm^3$ or greater, 6 N·mm per $cm^3$ or greater, 7 N·mm per $cm^3$ or greater, 8 N·mm per $cm^3$ or greater, or the like. Providing the voltage may comprise generating the voltage, for example, in an embodiment in which the power supply 48 (FIG. 14) is a battery, converting the voltage, for example in embodiment in which the power supply 48 (FIG. 14) is a power adaptor, or any other known or yet to be developed technique for readying a voltage for application. In one example, when the artificial muscle 100 is actuated by a voltage of 9.5 kilovolts (kV), the artificial muscle 100 provides a resulting force of 5 N. In another example, when the artificial muscle 100 is actuated by a voltage of 10 kV the artificial muscle 100 provides 440% strain under a 500 gram load.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168.

As shown in FIGS. 8 and 9, another embodiment of an artificial muscle 201 is illustrated. The artificial muscle 201 is substantially similar to the artificial muscle 100. As such, like structure is indicated with like reference numerals. However, as shown, the first electrode 106 does not include a central opening. Thus, only the second electrode 108 includes the central opening 168 formed therein. As shown in FIG. 8, the artificial muscle 201 is in the non-actuated state with the first electrode 106 being planar and the second electrode 108 being convex relative to the first electrode 106. In the non-actuated state, the expandable fluid region 196 has a first height H3. In the actuated state, as shown in FIG. 9, the expandable fluid region 196 has a second height H4, which is greater than the first height H3. It should be appreciated that by providing the central opening 168 only in the second electrode 108 as opposed to both the first electrode 106 and the second electrode 108, the total deformation may be formed on one side of the artificial muscle 201. In addition, because the total deformation is formed on only one side of the artificial muscle 201, the second height H4 of the expandable fluid region 196 of the artificial muscle 201 extends further from a longitudinal axis perpendicular to the central axis C of the artificial muscle 201 than the second height H2 of the expandable fluid region 196 of the artificial muscle 100 when all other dimensions, orientations, and volume of dielectric fluid are the same. It should be understood that embodiments of the artificial muscle 201 may be used together with or in place of the one or more artificial muscles 100 of the artificial muscle group 10 of FIGS. 2A-2C.

In some embodiments, as shown in FIG. 3, a pressure sensor 80 may reside on the housing 110 and be aligned with the central opening 168 or central opening 146, which are openings in the first electrode 106 and second electrode 108, respectively. In some embodiments, the pressure sensor 80 may be disposed on the expandable fluid region 196 of the housing 110. In other embodiments, the pressure sensor 80 may be located on any suitable surface of the housing 110 or an artificial muscle 100.

In some embodiments, different pressure sensors 80 within the artificial muscle group 10 may be located at different locations with respect to different housings 110 and/or an artificial muscles 100. In this embodiment, the pressure sensor 80 has two sensor protrusions 82 that extend outwardly from the pressure sensor 80 and may be disposed between the inner layer 30 and outer layer 20. Sensor protrusions may be used, for example, to wirelessly communicate with other components, such as a controller 50 (as shown in FIG. 14) and/or other wireless sensors located on other artificial muscles 100. In other embodiments, any number of sensor protrusions 82 of any shape, size, and/or configuration may be utilized. In still other embodiments, the pressure sensor 80 may have no sensor protrusions 82.

In some embodiments, the pressure sensor 80 may be of any suitable type, such as, by way of non-limiting example, absolute, gauge, or differential pressure sensors. Sensing by the pressure sensor 80 may include any suitable technique such as resistive sensing, capacitive sensing, piezoelectric sensing, optical sensing, micro electro-mechanical system (MEMS), or any other suitable type of pressure sensing technique. Output from the pressure sensor 80 may be by millivolt-output transducers, volt-output transducers, transmitters, or any other suitable components.

Figure 10:
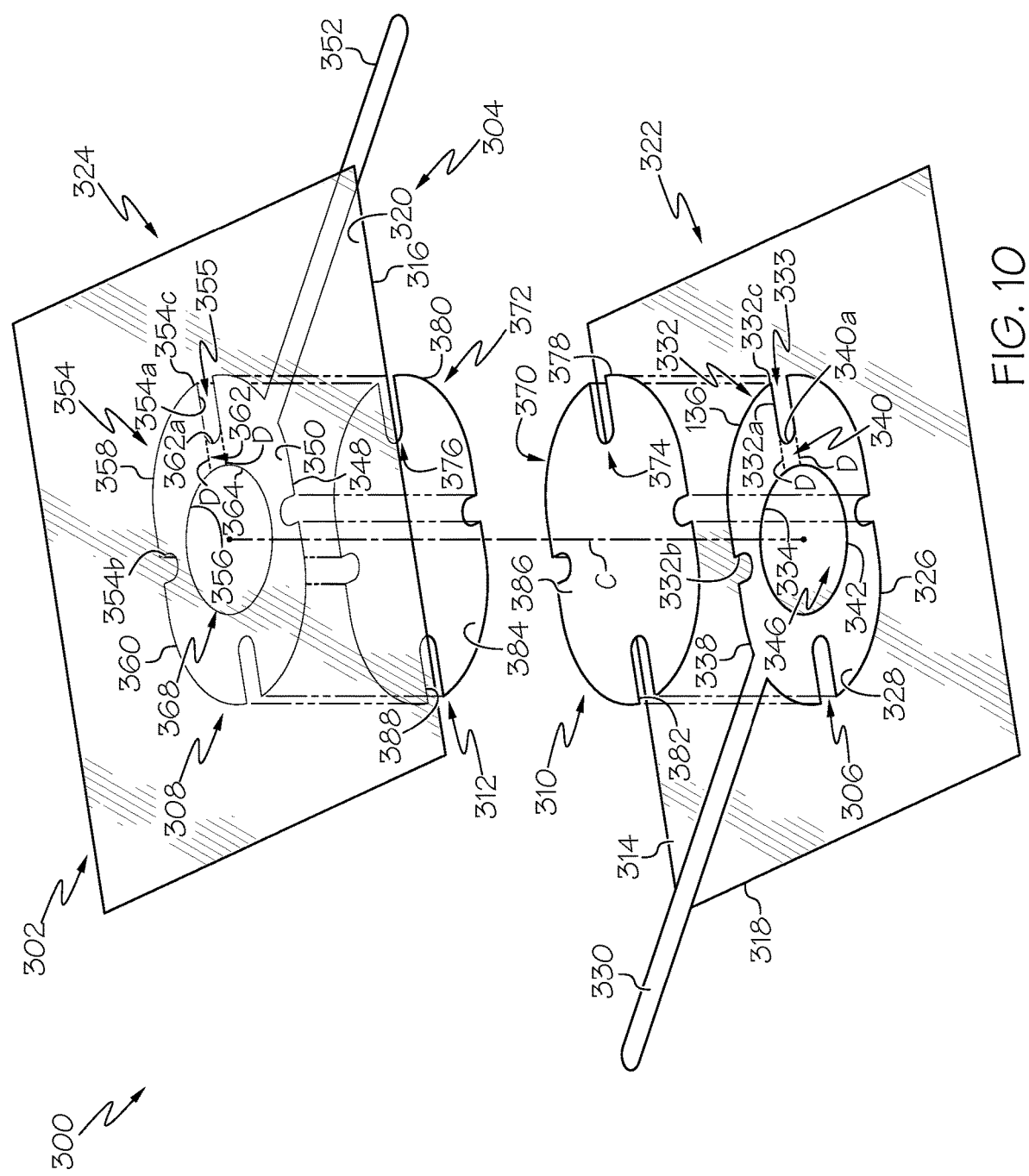
FIG. 10 schematically depicts an exploded view of another illustrative artificial muscle, according to one or more embodiments shown and described herein.
Figure 11:
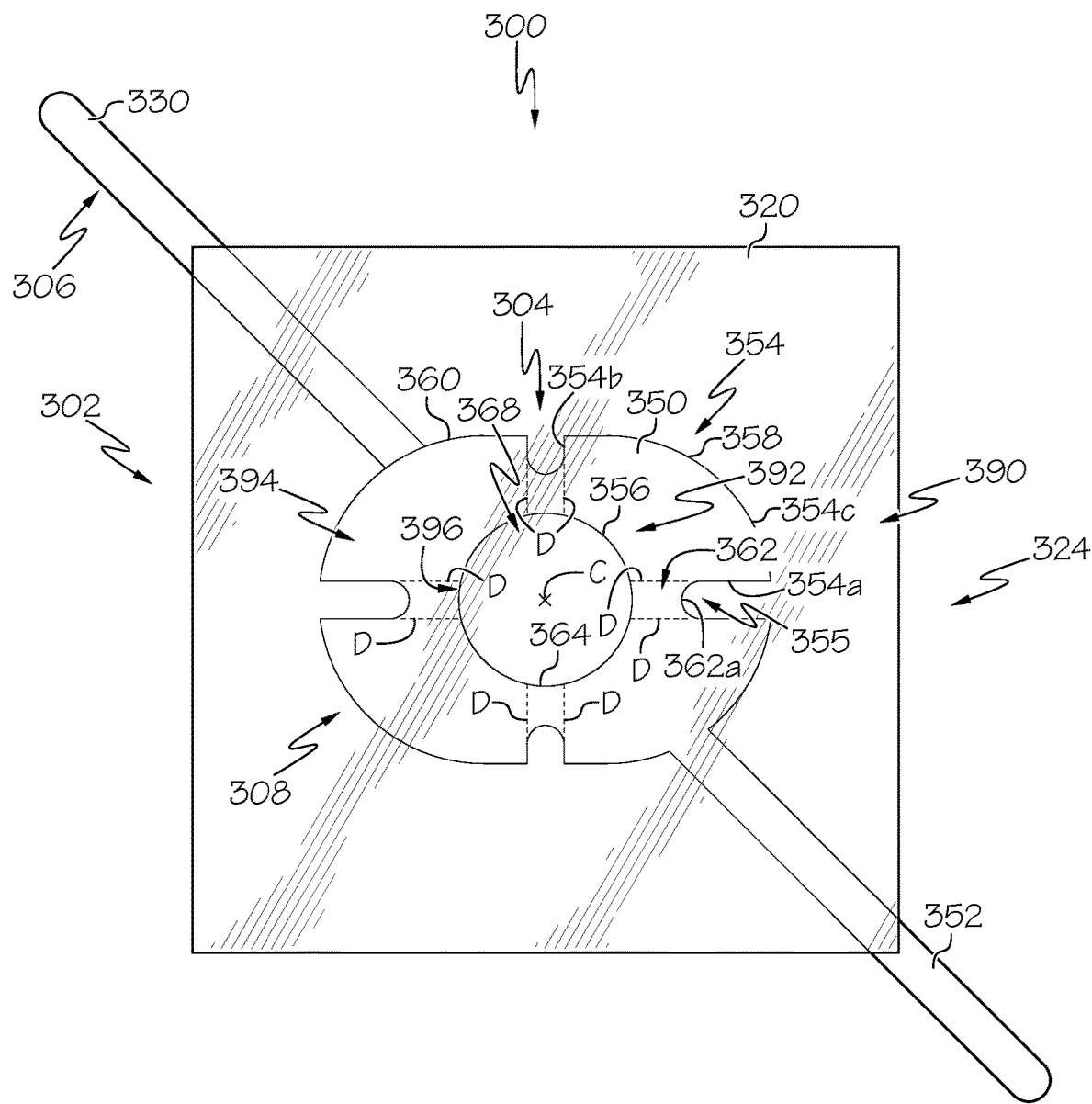
FIG. 11 schematically depicts a top view of the artificial muscle of FIG. 10, according to one or more embodiments shown and described herein.
Figure 12:
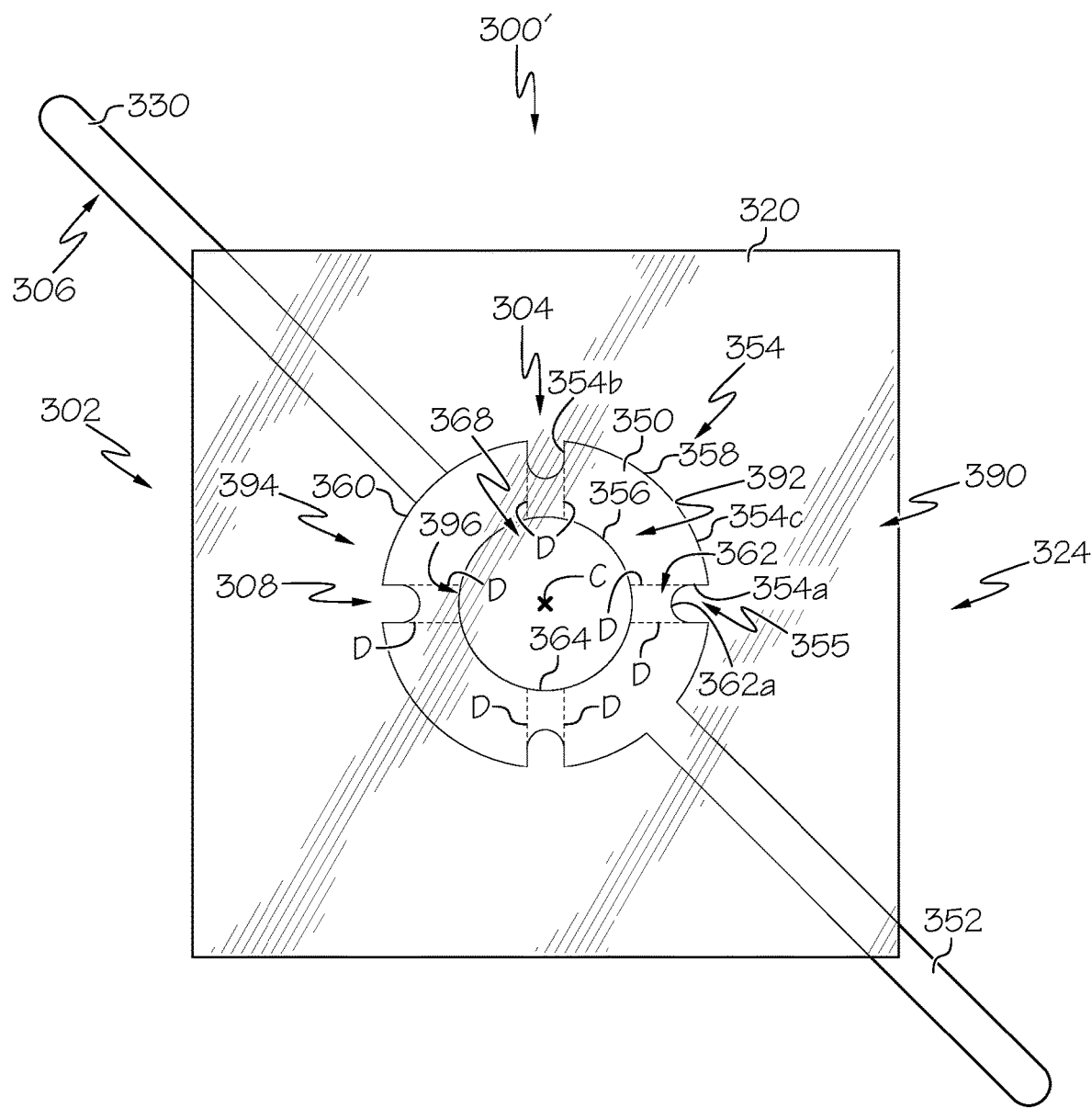
FIG. 12 schematically depicts a top view of another artificial muscle, according to one or more embodiments shown and described herein.

As shown in FIGS. 10-12, another embodiment of an artificial muscle 300 is illustrated. It should be appreciated that the artificial muscle 300 includes similar structure as the artificial muscle 100 (FIGS. 4-9) and therefore operates similarly in operation to the artificial muscle 100 (FIGS. 4-9). Accordingly, the artificial muscle 300 described herein may be incorporated in the artificial muscle chair device 1 (FIG. 1A-1B) instead of, or in addition to, the previously described artificial muscles. Notably, the artificial muscle 300 includes fan portions 332 in place of the tab portions 132 discussed in relation to the artificial muscle 100. However, it should be understood that both the fan portions 332 of the artificial muscle 300 and the tab portions 132 are each generally a radially extending portion of an electrode of an artificial muscle, are positioned adjacent bridge portions, and provide a zipping functionality, as described above with respect to the artificial muscle 100, and below with respect to the artificial muscle 300. Indeed, these radially extending portions (e.g., tab portions and fan portions) each provide increased actuator power per unit volume, while minimizing buckling and rupture during operation.

Referring now to FIGS. 10 and 11, the artificial muscle 300 includes a housing 302, an electrode pair 304, including a first electrode 306 and a second electrode 308, fixed to opposite surfaces of the housing 302, a first electrical insulator layer 310 fixed to the first electrode 306, and a second electrical insulator layer 312 fixed to the second electrode 308. In some embodiments, the housing 302 is a one-piece monolithic layer including a pair of opposite inner surfaces, such as a first inner surface 314 and a second inner surface 316, and a pair of opposite outer surfaces, such as a first outer surface 318 and a second outer surface 320. In some embodiments, the first inner surface 314 and the second inner surface 316 of the housing 302 are heat-sealable. In other embodiments, the housing 302 may be a pair of individually fabricated film layers, such as a first film layer 322 and a second film layer 324. Thus, the first film layer 322 includes the first inner surface 314 and the first outer surface 318, and the second film layer 324 includes the second inner surface 316 and the second outer surface 320.

While reference may be made to the housing 302 including the first film layer 322 and the second film layer 324, as opposed to the one-piece housing. It should be understood that either arrangement is contemplated. In some embodiments, the first film layer 322 and the second film layer 324 generally include the same structure and composition. For example, in some embodiments, the first film layer 322 and the second film layer 324 each comprises biaxially oriented polypropylene.

The first electrode 306 and the second electrode 308 are each positioned between the first film layer 322 and the second film layer 324. In some embodiments, the first electrode 306 and the second electrode 308 are each aluminum-coated polyester such as, for example, Mylar®. In addition, one of the first electrode 306 and the second electrode 308 is a negatively charged electrode and the other of the first electrode 306 and the second electrode 308 is a positively charged electrode. For purposes discussed herein, either electrode 306, 308 may be positively charged so long as the other electrode 306, 308 of the artificial muscle 300 is negatively charged.

The first electrode 306 has a film-facing surface 326 and an opposite inner surface 328. The first electrode 306 is positioned against the first film layer 322, specifically, the first inner surface 314 of the first film layer 322. In addition, the first electrode 306 includes a first terminal 330 extending from the first electrode 306 past an edge of the first film layer 322 such that the first terminal 330 can be connected to a power supply to actuate the first electrode 306. Specifically, the terminal is coupled, either directly or in series, to a power supply and a controller of the actuation system 1100 (FIG. 14). Similarly, the second electrode 308 has a film-facing surface 348 and an opposite inner surface 350. The second electrode 308 is positioned against the second film layer 324, specifically, the second inner surface 316 of the second film layer 324. The second electrode 308 includes a second terminal 352 extending from the second electrode 308 past an edge of the second film layer 324 such that the second terminal 352 can be connected to a power supply and a controller of the actuation system 1100 (FIG. 14) to actuate the second electrode 308.

With respect now to the first electrode 306, the first electrode 306 includes two or more fan portions 332 extending radially from a center axis C of the artificial muscle 300. In some embodiments, the first electrode 306 includes only two fan portions 332 positioned on opposite sides or ends of the first electrode 306. In some embodiments, the first electrode 306 includes more than two fan portions 332, such as three, four, or five fan portions 332. In embodiments in which the first electrode 306 includes an even number of fan portions 332, the fan portions 332 may be arranged in two or more pairs of fan portions 332. As shown in FIG. 10, the first electrode 306 includes four fan portions 332. In this embodiment, the four fan portions 332 are arranged in two pairs of fan portions 332, where the two individual fan portions 332 of each pair are diametrically opposed to one another.

Each fan portion 332 has a first side edge 332a and an opposite second side edge 332b. As shown, the first terminal 330 extends from a second end 336 of one of the fan portions 332 and is integrally formed therewith. A channel 333 is at least partially defined by opposing side edges 332a, 332b of adjacent fan portions 332 and, thus, extends radially toward the center axis C. The channel 333 terminates at an end 340a of a bridge portion 340 interconnecting adjacent fan portions 332.

As shown in FIG. 10, dividing lines D are included to depict the boundary between the fan portions 332 and the bridge portions 340. The dividing lines D extend from the side edges 332a, 332b of the fan portions 332 to a first end 334 of the fan portions 332 collinear with the side edges 332a, 332b. It should be understood that dividing lines D are shown in FIG. 10 for clarity and that the fan portions 332 are integral with the bridge portions 340. The first end 334 of the fan portion 332, which extends between adjacent bridge portions 340, defines an inner length of the fan portion 332. Due to the geometry of the fan portion 332 tapering toward the center axis C between the first side edge 332a and the second side edge 332b, the second end 336 of the fan portion 332 defines an outer length of the fan portion 332 that is greater than the inner length of the fan portion 332.

Moreover, each fan portion 332 has a pair of corners 332c defined by an intersection of the second end 336 and each of the first side edge 332a and the second side edge 332b of the fan portion 332. In embodiments, the corners 332c are formed at an angle equal to or less than 90 degrees. In other embodiments, the corners 332c are formed at an acute angle.

As shown in FIG. 10, each fan portion 332 has a first side length defined by a distance between the first end 334 of the fan portion 332 and the second end 336 of the fan portion 332 along the first side edge 332a and the dividing line D that is collinear with the first side edge 332a. Each fan portion 332 also has a second side length defined by a distance between the first end 334 of the fan portion 332 and the second end 336 of the fan portion 332 along the second side edge 332b and the dividing line D that is collinear with the second side edge 332b. In embodiments, the first side length is greater than the second side length of the fan portion 332 such that the first electrode 306 has an ellipsoid geometry.

The second end 336, the first side edge 332a and the second side edge 332b of each fan portion 332, and the bridge portions 340 interconnecting the fan portions 332 define an outer perimeter 338 of the first electrode 306. In embodiments, a central opening 346 is formed within the first electrode 306 between the fan portions 332 and the bridge portions 340, and is coaxial with the center axis C. Each fan portion 332 has a fan length extending from a perimeter 342 of the central opening 346 to the second end 336 of the fan portion 332. Each bridge portion 340 has a bridge length extending from a perimeter 342 of the central opening 346 to the end 340a of the bridge portion 340, i.e., the channel 333. As shown, the bridge length of each of the bridge portions 340 is substantially equal to one another. Each channel 333 has a channel length defined by a distance between the end 340a of the bridge portion 340 and the second end of the fan portion 332. Due to the bridge length of each of the bridge portions 340 being substantially equal to one another and the first side length of the fan portions 332 being greater than the second side length of the fan portions 332, a first pair of opposite channels 333 has a channel length greater than a channel length of a second pair of opposite channels 333. As shown, a width of the channel 333 extending between opposing side edges 332a, 332b of adjacent fan portions 332 remains substantially constant due to opposing side edges 332a, 332b being substantially parallel to one another.

In embodiments, the central opening 346 has a radius of 2 centimeters (cm) to 5 cm. In embodiments, the central opening 346 has a radius of 3 cm to 4 cm. In embodiments, a total fan area of each of the fan portions 332 is equal to or greater than twice an area of the central opening 346. It should be appreciated that the ratio between the total fan area of the fan portions 332 and the area of the central opening 346 is directly related to a total amount of deflection of the first film layer 322 when the artificial muscle 300 is actuated. In embodiments, the bridge length is 20% to 50% of the fan length. In embodiments, the bridge length is 30% to 40% of the fan length. In embodiments in which the first electrode 306 does not include the central opening 346, the fan length and the bridge length may be measured from a perimeter of an imaginary circle coaxial with the center axis C.

Similar to the first electrode 306, the second electrode 308 includes two or more fan portions 354 extending radially from the center axis C of the artificial muscle 300. The second electrode 308 includes substantially the same structure as the first electrode 306 and, thus, includes the same number of fan portions 354. Specifically, the second electrode 308 is illustrated as including four fan portions 354. However, it should be appreciated that the second electrode 308 may include any suitable number of fan portions 354.

Each fan portion 354 of the second electrode 308 has a first side edge 354a and an opposite second side edge 354b. As shown, the second terminal 352 extends from a second end 358 of one of the fan portions 354 and is integrally formed therewith. A channel 355 is at least partially defined by opposing side edges 354a, 354b of adjacent fan portions 354 and, thus, extends radially toward the center axis C. The channel 355 terminates at an end 362a of a bridge portion 362 interconnecting adjacent fan portions 354.

As shown in FIG. 10, additional dividing lines D are included to depict the boundary between the fan portions 354 and the bridge portions 362. The dividing lines D extend from the side edges 354a, 354b of the fan portions 354 to the first end 356 of the fan portions 354 collinear with the side edges 354a, 354b. It should be understood that dividing lines D are shown in FIG. 10 for clarity and that the fan portions 354 are integral with the bridge portions 362. The first end 356 of the fan portion 354, which extends between adjacent bridge portions 362, defines an inner length of the fan portion 354. Due to the geometry of the fan portion 354 tapering toward the center axis C between the first side edge 354a and the second side edge 354b, the second end 358 of the fan portion 354 defines an outer length of the fan portion 354 that is greater than the inner length of the fan portion 354.

Moreover, each fan portion 354 has a pair of corners 354c defined by an intersection of the second end 358 and each of the first side edge 354a and the second side edge 354b of the fan portion 354. In embodiments, the corners 354c are formed at an angle equal to or less than 90 degrees. In other embodiments, the corners 354c are formed at an acute angle. During actuation of the artificial muscle 300, the corners 332c of the first electrode 306 and the corners 354c of the second electrode 308 are configured to be attracted to one another at a lower voltage as compared to the rest of the first electrode 306 and the second electrode 308. Thus, actuation of the artificial muscle 300 initially at the corners 332c, 354c results in the outer perimeter 338 of the first electrode 306 and the outer perimeter 360 of the second electrode 308 being attracted to one another at a lower voltage and reducing the likelihood of air pockets or voids forming between the first electrode 306 and the second electrode 308 after actuation of the artificial muscle 300.

As shown in FIGS. 10 and 11, in embodiments, the first side edge 354a of each fan portion 354 has a first side length defined by a distance between the first end 356 of the fan portion 354 and the second end 358 of the fan portion 354 along the first side edge 354a and the dividing line D that is collinear with the first side edge 354a. Each fan portion 354 also has a second side length defined by a distance between the first end 356 of the fan portion 354 and the second end 358 of the fan portion 354 along the second side edge 354b and the dividing line D that is collinear with the second side edge 354b. In embodiments, the first side length is greater than the second side length of the fan portion 354 such that the second electrode 308 has an ellipsoid geometry corresponding to the geometry of the first electrode 306.

The second end 358, the first side edge 354a and the second side edge 354b of each fan portion 354, and the bridge portions 362 interconnecting the fan portions 354 define an outer perimeter 360 of the second electrode 308. In embodiments, a central opening 368 is formed within the second electrode 308 between the fan portions 354 and the bridge portions 362, and is coaxial with the center axis C. Each fan portion 354 has a fan length extending from a perimeter 364 of the central opening 368 to the second end 358 of the fan portion 354. Each bridge portion 362 has a bridge length extending from the central opening 368 to the end 362a of the bridge portion 362, i.e., the channel 355. As shown, the bridge length of each of the bridge portions 362 is substantially equal to one another. Each channel 355 has a channel length defined by a distance between the end 362a of the bridge portion 362 and the second end of the fan portion 354. Due to the bridge length of each of the bridge portions 362 being substantially equal to one another and the first side length of the fan portions 354 being greater than the second side length of the fan portions 354, a first pair of opposite channels 355 has a channel length greater than a channel length of a second pair of opposite channels 355. As shown, a width of the channel 355 extending between opposing side edges 354a, 354b of adjacent fan portions 354 remains substantially constant due to opposing side edges 354a, 354b being substantially parallel to one another.

In embodiments, the central opening 368 has a radius of 2 cm to 5 cm. In embodiments, the central opening 368 has a radius of 3 cm to 4 cm. In embodiments, a total fan area of each of the fan portions 354 is equal to or greater than twice an area of the central opening 368. It should be appreciated that the ratio between the total fan area of the fan portions 354 and the area of the central opening 368 is directly related to a total amount of deflection of the second film layer 324 when the artificial muscle 300 is actuated. In embodiments, the bridge length is 20% to 50% of the fan length. In embodiments, the bridge length is 30% to 40% of the fan length. In embodiments in which the second electrode 308 does not include the central opening 368, the fan length and the bridge length may be measured from a perimeter of an imaginary circle coaxial with the center axis C.

As described herein, the first electrode 306 and the second electrode 308 each have a central opening 346, 368 coaxial with the center axis C. However, it should be understood that the first electrode 306 does not need to include the central opening 346 when the central opening 368 is provided within the second electrode 308. Alternatively, the second electrode 308 does not need to include the central opening 368 when the central opening 346 is provided within the first electrode 306.

Referring again to FIG. 10, the first electrical insulator layer 310 and the second electrical insulator layer 312 have a substantially ellipsoid geometry generally corresponding to the geometry of the first electrode 306 and the second electrode 308, respectively. Thus, the first electrical insulator layer 310 and the second electrical insulator layer 312 each have fan portions 370, 372 and bridge portions 374, 376 corresponding to like portions on the first electrode 306 and the second electrode 308. Further, the first electrical insulator layer 310 and the second electrical insulator layer 312 each have an outer perimeter 378, 380 corresponding to the outer perimeter 338 of the first electrode 306 and the outer perimeter 360 of the second electrode 308, respectively, when positioned thereon.

It should be appreciated that, in some embodiments, the first electrical insulator layer 310 and the second electrical insulator layer 312 generally include the same structure and composition. As such, in some embodiments, the first electrical insulator layer 310 and the second electrical insulator layer 312 each include an adhesive surface 382, 384 and an opposite non-sealable surface 386, 388, respectively. Thus, in some embodiments, the first electrical insulator layer 310 and the second electrical insulator layer 312 are each a polymer tape adhered to the inner surface 328 of the first electrode 306 and the inner surface 350 of the second electrode 308, respectively.

Referring now to FIG. 11, the artificial muscle 300 is shown in its assembled form with the first terminal 330 of the first electrode 306 and the second terminal 352 of the second electrode 308 extending past an outer perimeter of the housing 302, i.e., the first film layer 322 (FIG. 10) and the second film layer 324. The second electrode 308 is stacked on top of the first electrode 306 and, therefore, the first film layer 322 (FIG. 10) is not shown. In its assembled form, the first electrode 306, the second electrode 308, the first electrical insulator layer 310 (FIG. 10), and the second electrical insulator layer 312 (FIG. 10) are sandwiched between the first film layer 322 (FIG. 10) and the second film layer 324. The first film layer 322 (FIG. 10) is partially sealed to the second film layer 324 at an area surrounding the outer perimeter 338 (FIG. 10) of the first electrode 306 and the outer perimeter 360 of the second electrode 308. In some embodiments, the first film layer 322 (FIG. 10) is heat-sealed to the second film layer 324 (FIG. 10). Specifically, in some embodiments, the first film layer 322 (FIG. 13) is sealed to the second film layer 324 to define a sealed portion 390 surrounding the first electrode 306 and the second electrode 308. The first film layer 322 (FIG. 10) and the second film layer 324 may be sealed in any suitable manner, such as using an adhesive, heat sealing, vacuum sealing, or the like.

The first electrode 306, the second electrode 308, the first electrical insulator layer 310 (FIG. 10), and the second electrical insulator layer 312 (FIG. 10) provide a barrier that prevents the first film layer 322 (FIG. 10) from sealing to the second film layer 324, forming an unsealed portion 392. The unsealed portion 392 of the housing 302 includes an electrode region 394, in which the electrode pair 304 is provided, and an expandable fluid region 396, which is surrounded by the electrode region 394. The central openings 346 (FIG. 10), 368 of the first electrode 306 and the second electrode 308 define the expandable fluid region 396 and are arranged to be axially stacked on one another. Although not shown, the housing 302 may be cut to conform to the geometry of the electrode pair 304 and reduce the size of the artificial muscle 300, namely, the size of the sealed portion 390. A dielectric fluid is provided within the unsealed portion 392 and flows freely between the first electrode 306 and the second electrode 308

Referring now to FIG. 12, an alternative embodiment of an artificial muscle 300' is illustrated. It should be appreciated that the artificial muscle 300' is similar to the artificial muscle 300 described herein. As such, like structure is indicated with like reference numerals. The first electrode 306 and the second electrode 308 of the artificial muscle 300' have a circular geometry as opposed to the ellipsoid geometry of the first electrode 306 and the second electrode 308 of the artificial muscle 300 described herein. As shown in FIG. 12, with respect to the second electrode 308, a first side edge length of the first side edge 354a is equal to a second side edge length of the second side edge 354b. Accordingly, the channels 355 formed between opposing side edges 354a, 354b of the fan portions 354 each have an equal length. Although the first electrode 306 is hidden from view in FIG. 12 by the second electrode 308, it should be appreciated that the first electrode 306 also has a circular geometry corresponding to the geometry of the second electrode 308.

Referring again to FIGS. 10 and 11, actuation of the artificial muscle 300 will be discussed. In the non-actuated state, the first electrode 306 and the second electrode 308 are partially spaced apart from one another proximate the central openings 346, 368 thereof and the first end 334, 356 of the fan portions 332, 354. The second end 336, 358 of the fan portions 332, 354 remain in position relative to one another due to the housing 302 being sealed at the outer perimeter 338 of the first electrode 306 and the outer perimeter 360 of the second electrode 308. In the actuated state, the first electrode 306 and the second electrode 308 are brought into contact with and oriented parallel to one another to force the dielectric fluid 398 into the expandable fluid region 396. This causes the dielectric fluid 398 to flow through the central openings 346, 368 of the first electrode 306 and the second electrode 308 and inflate the expandable fluid region 396.

In the non-actuated state, a distance between the first end 334 of the fan portion 332 of the first electrode 306 and the first end 356 of the fan portion 354 of the second electrode 308 is greater than a distance between the second end 336 of the fan portion 332 of the first electrode 306 and the second end 358 of the fan portion 354 of the second electrode 308. This results in the electrode pair 304 zippering toward the expandable fluid region 396 when actuated. When actuated, the first electrode 306 and the second electrode 308 zipper toward one another from the second ends 336, 358 of the fan portions 332, 354 thereof, thereby pushing the dielectric fluid 398 into the expandable fluid region 396. When in the actuated state, the first electrode 306 and the second electrode 308 are parallel to one another. In the actuated state, the dielectric fluid 398 flows into the expandable fluid region 396 to inflate the expandable fluid region 396. As such, the first film layer 322 and the second film layer 324 expand in opposite directions.

Figure 13A:
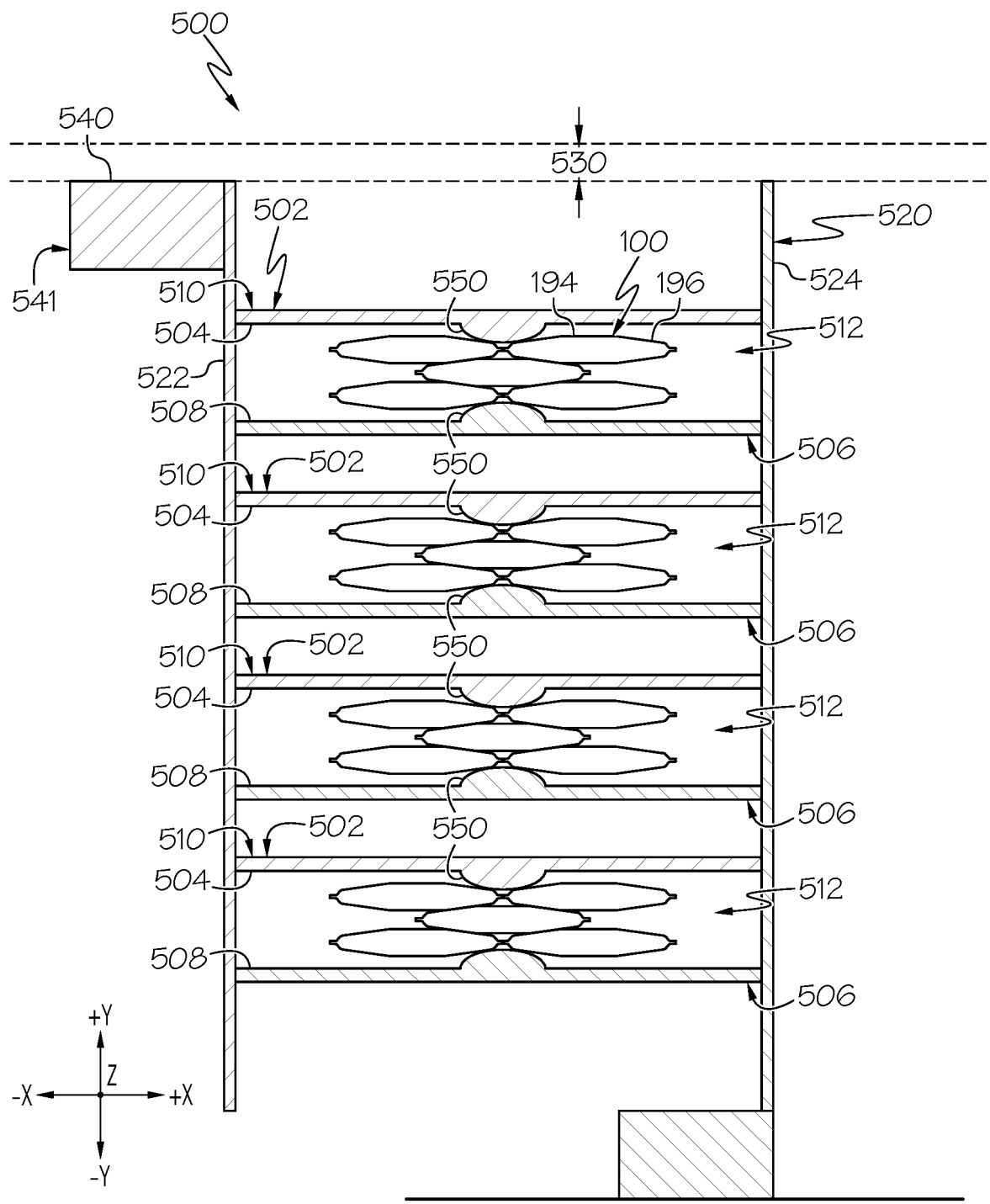
FIG. 13A schematically depicts a cross section of another embodiment of a layered actuation structure comprising artificial muscles in a non-actuated state, according to one or more embodiments shown and described herein.
Figure 13B:
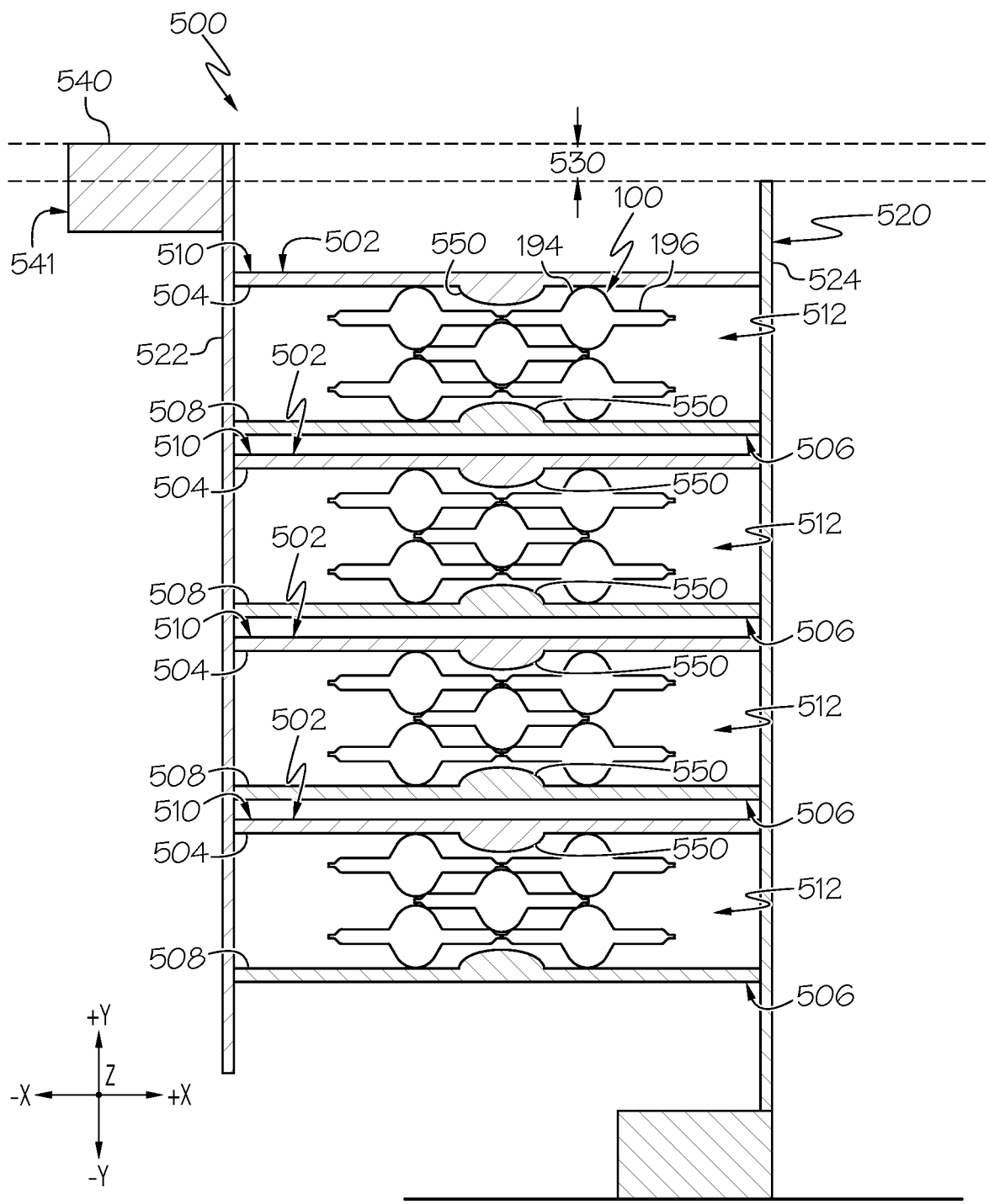
FIG. 13B schematically depicted the layered actuation structure of FIG. 13A in which the artificial muscles are in an actuated state, according to one or more embodiments shown and described herein.

Referring now to FIGS. 13A and 13B, the layered actuation structure 500 is schematically depicted. FIG. 13A schematically depicts the layered actuation structure 500 in a non-actuated state. FIG. 13B schematically depicts the layered actuation structure 500 in an actuated state. FIGS. 13A and 13B provide a side cutaway view of an embodiment of the layered actuation structure 3 that differs from the embodiment depicted in FIGS. 1A-1B and 2C and may be embedded in the artificial muscle chair device 1. The layered actuation structure 500 includes one or more actuation platforms 502 interleaved with one or more mounting platforms 506 to form one or more platform pairs 510. Each platform pair 510 includes a mounting platform 506 and actuation platform 502 forming an actuation cavity 512 therebetween. The layered actuation structure 500 may have a plurality of actuation cavities 512, such that a plurality of artificial muscles 100 may be disposed within one or more of the plurality of actuation cavities 512. In some embodiments, there may be a plurality of artificial muscles 100 in each of the plurality of actuation cavities 512, such that some or all artificial muscles 100 in one actuation cavity 512 are in an actuated state and some or all artificial muscles 100 in another actuation cavity 512 are in a non-actuated state.

The one or more actuation platforms 502 each comprise a cavity facing surface 504. Similarly, the one or more mounting platforms 506 each comprise a cavity-facing surface 508. In each platform pair 510, the cavity-facing surface 504 of the individual actuation platform 502 faces the cavity-facing surface 508 of the individual mounting platform 506. In some embodiments, the actuation platforms 502 and the mounting platforms 506 each comprise a thickness of from ¼ inch to ½₃₂ inch, for example, ¼ inch, ⅛ inch, ¹⁄₁₀ inch, ¹⁄₁₂ inch, ¹⁄₁₆ inch, ¹⁄₂₀ inch, ¹⁄₂₄ inch, ¹⁄₂₈ inch, ¹⁄₃₂ inch, or any range having any two of these values as endpoints.

Referring still to FIGS. 13A and 13B, each of the platform pairs 510 is spaced from at least one adjacent one of the platform pairs 510 by at least a cavity displacement distance 530 to provide clearance for the one or more actuation platforms 502 to move relative to the one or more mounting platforms 506 in a movement direction (e.g., the Y-direction depicted in FIGS. 13A and 13B). Moreover, one or more artificial muscles 100, 300, 300' are disposed in each of the actuation cavities 512 such that actuation of the one or more artificial muscles 100, 300, 300' that is, expansion of the expandable fluid region 196, 396, applies pressure to the one or more actuation platforms 502, generating translational motion of the one or more actuation platforms 502. While the artificial muscles 100 are depicted in FIGS. 13A and 13B, it should be understood that the layered actuation structure 500 may include any embodiment of an artificial muscle 100, 300, 300' described herein. In some embodiments, a single artificial muscle 100, 300, 300' is disposed in some or all of the actuation cavities 512. In other embodiments, a plurality of artificial muscles 100, 300, 300' are disposed in some or all of the actuation cavities 512. Moreover, when a plurality of artificial muscles 100, 300, 300' are disposed in an actuation cavity, the plurality of artificial muscles 100, 300, 300' may be disposed in an artificial muscle stack comprising a plurality of artificial muscles layers arranged in an alternating offset arrangement. In an alternating offset arrangement a plurality of artificial muscle layers are arranged such that each expandable fluid region 196, 396 of the housing 110, 302 of the one or more artificial muscles 100, 300, 300' of each artificial muscle layer overlaps at least one radially extending portion 132, 154, 332, 354 of one or more artificial muscles 100, 300, 300' of an adjacent artificial muscle layer. In other words, each expandable fluid region 196, 396 of the housing 110, 302 of the one or more artificial muscles 100, 300, 300' of each artificial muscle layer overlaps the electrode region 194, 394 of the housing 110, 302 of one or more artificial muscles 100, 300, 300' of an adjacent artificial muscle layer. In other embodiments, the plurality of artificial muscles may be disposed in an artificial muscle stack comprising a plurality of artificial muscle layers arranged in a coaxial arrangement. In a coaxial arrangement, the expandable fluid regions 196, 396 of each individual artificial muscle 100, 300, 300' of an individual artificial muscle layer is in coaxial alignment with an individual artificial muscle 100, 300, 300' of each of the other individual artificial muscle layers. It should be appreciated that the artificial muscles 100, 300, 300' may be arranged in the actuation cavities 512 in any other desirable arrangement.

In some embodiments, as shown in FIGS. 13A and 13B, the one or more actuation platforms 502 and the one or more mounting platforms 506 each comprise one or more bumps 550 extending into the one or more actuation cavities 512. In particular, the bumps 550 extend outward from the cavity-facing surface 504 of the actuation platforms 502 and the cavity-facing surface 508 of the mounting platforms 506. The one or more bumps 550 are sized and positioned to overlap with the electrode region 194, 394 of at least one of the one or more artificial muscles 100, 300, 300' arranged in the actuation cavities 512. In operation, when the expandable fluid regions 196, 396 of the artificial muscles 100, 300, 300' expand and press against the cavity-facing surfaces 504, 508 of the actuation platform 502 and the mounting platform 506, the contracted electrode regions 194, 394 press against the bump 550. In some embodiments, the bumps 550 are arranged to correspond with the alternating offset arrangement of the artificial muscle stack. That is, the one or more bumps 550 are positioned such that an individual bump 550 aligns with at least one radially extending portion 132, 154, 332, 354 which is positioned in the electrode region 194, 394 of at least one artificial muscle 100, 300, 300'.

Referring now to FIG. 14, an actuation system 1100 may be provided for operating the artificial muscle group 10, in particular, operate the one or more artificial muscles 100 of the artificial muscle group 10. The actuation system 1100 may comprise a controller 50, the one or more pressure sensors 80, an operating device 46, a power supply 48, a display device 42, network interface hardware 44, and a communication path 41 communicatively coupled these components, some or all of which may be disposed in the onboard control unit 40.

The controller 50 may comprise a processor 52 and a non-transitory electronic memory 54 to which various components are communicatively coupled. In some embodiments, the processor 52 and the non-transitory electronic memory 54 and/or the other components are included within a single device. In other embodiments, the processor 52 and the non-transitory electronic memory 54 and/or the other components may be distributed among multiple devices that are communicatively coupled. The controller 50 may include non-transitory electronic memory 54 that stores a set of machine-readable instructions. The processor 52 may execute the machine-readable instructions stored in the non-transitory electronic memory 54. The non-transitory electronic memory 54 may comprise RAM, ROM, flash memories, hard drives, or any device capable of storing machine-readable instructions such that the machine-readable instructions can be accessed by the processor 52. Accordingly, the actuation system 1100 described herein may be implemented in any computer programming language, as pre-programmed hardware elements, or as a combination of hardware and software components. The non-transitory electronic memory 54 may be implemented as one memory module or a plurality of memory modules.

In some embodiments, the non-transitory electronic memory 54 includes instructions for executing the functions of the actuation system 1100. The instructions may include instructions for operating the artificial muscle group 10, for example, instructions for actuating the one or more artificial muscles 100, individually or collectively, and actuating the artificial muscles stacks, individually or collectively.

The processor 52 may be any device capable of executing machine-readable instructions. For example, the processor 52 may be an integrated circuit, a microchip, a computer, or any other computing device. The non-transitory electronic memory 54 and the processor 52 are coupled to the communication path 41 that provides signal interconnectivity between various components and/or modules of the actuation system 1100. Accordingly, the communication path 41 may communicatively couple any number of processors with one another, and allow the modules coupled to the communication path 41 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 14, the communication path 41 communicatively couples the processor 52 and the non-transitory electronic memory 54 of the controller 50 with a plurality of other components of the actuation system 1100. For example, the actuation system 1100 depicted in FIG. 14 includes the processor 52 and the non-transitory electronic memory 54 communicatively coupled with the pressure sensor 80, operating device 46, and the power supply 48.

The operating device 46 allows for a user to control operation of the artificial muscles 100 of the artificial muscle group 10. In some embodiments, the operating device 46 may be a switch, toggle, button, or any combination of controls to provide user operation. The operating device 46 is coupled to the communication path 41 such that the communication path 41 communicatively couples the operating device 46 to other modules of the actuation system 1100. The operating device 46 may provide a user interface for receiving user instructions as to a specific operating configuration of the artificial muscle group 10, such as an amount desired actuation.

The power supply 48 (e.g., battery) provides power to the one or more artificial muscles 100 of the artificial muscle group 10. In some embodiments, the power supply 48 is a rechargeable direct current power source. It is to be understood that the power supply 48 may be a single power supply or battery for providing power to the one or more artificial muscles 100 of the artificial muscle group 10. A power adapter (not shown) may be provided and electrically coupled via a wiring harness or the like for providing power to the one or more artificial muscles 100 of the artificial muscle group 10 via the power supply 48. Indeed, the power supply 48 is a device that can receive power at one level (e.g., one voltage, power level, or current) and output power at a second level (e.g., a second voltage, power level, or current).

In some embodiments, the actuation system 1100 also includes a display device 42. The display device 42 is coupled to the communication path 41 such that the communication path 41 communicatively couples the display device 42 to other modules of the actuation system 1100. The display device 42 may be located on the artificial muscle group 10, for example, as part of the onboard control unit 40, and may output a notification in response to an actuation state of the artificial muscles 100 of the artificial muscle group 10 or indication of a change in the actuation state of the one or more artificial muscles 100 of the artificial muscle group 10. The display device 42 may be a touchscreen that, in addition to providing optical information, detects the presence and location of a tactile input upon a surface of or adjacent to the display device 42. Accordingly, the display device 42 may include the operating device 46 and receive mechanical input directly upon the optical output provided by the display device 42. For example, a user may be able to specify a desired actuation pressure value.

In some embodiments, the actuation system 1100 includes network interface hardware 44 for communicatively coupling the actuation system 1100 to a portable device 70 via a network 60. The portable device 70 may include, without limitation, a smartphone, a tablet, a personal media player, or any other electric device that includes wireless communication functionality. The portable device 70 may correspond to the screen 9 depicted in FIG. 1B, an infotainment device, or any other type of device capable of communicating with the network interface hardware 44, utilizing Wi-Fi, Bluetooth, and/or any other suitable communication protocol. It is to be appreciated that, when provided, the portable device 70 may serve to provide user commands to the controller 50, instead of the operating device 46. As such, a user may be able to control or set a program for controlling the artificial muscles 100 of the artificial muscle group 10 utilizing the controls of the operating device 46. Thus, the artificial muscles 100 of the artificial muscle group 10 may be controlled remotely via the portable device 70 wirelessly communicating with the controller 50 via the network 60. For example, the user may be able to specify a desired pressure value. The portable device 70 may also receive and display pressure readings from one or more pressure sensors 80 associated with one or more of the artificial muscles 100.

It should now be understood that embodiments described herein are directed to artificial muscle chair devices that include artificial muscles embedded within a chair. In this way, actuation of the artificial muscles can be accomplished in a lighter-weight chair that is more suitable for use in a vehicle. The artificial muscles may be utilized to provide a variety of beneficial types of pressure, such as massaging patterns of pressure, and/or haptic feedback. The pressure exerted, which may include haptic feedback, may be based upon occupant input, vehicle operation, and/or as output from an infotainment device.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An artificial muscle chair device comprising:
   a plurality of artificial muscles embedded in a chair, where each artificial muscle comprises:
   a housing having an electrode region and an expandable fluid region;
   a first electrode and a second electrode each disposed in the electrode region of the housing; and
   a first electrical insulator layer fixed to a surface of the first electrode opposite the housing and extending across the electrode region and an entirety of the expandable fluid region; and
   a dielectric fluid disposed within the housing, where the first and second electrodes are configured to electrostatically attract, inflating the expandable fluid region with the dielectric fluid and thereby applying selective pressure to an outer surface of the chair.

2. The artificial muscle chair device of claim 1, wherein:
   the first electrode and the second electrode each comprise two or more radially extending portions and two or more bridge portions;
   each of the two or more bridge portions interconnects adjacent radially extending portions; and
   at least one of the first electrode and the second electrode comprises a central opening positioned between the two or more radially extending portions and at least one of the first electrode and the second electrode encircling the expandable fluid region.

3. The artificial muscle chair device of claim 2, wherein the two or more radially extending portions comprise two or more fan portions, wherein:
   each fan portion includes a first end having an inner length, a second end having an outer length, a first side edge extending from the second end, and a second side edge extending from the second end, wherein the outer length is greater than the inner length;
   each bridge portion interconnects adjacent fan portions at the first end of the adjacent fan portions; and
   at least one of the first electrode and the second electrode comprises a central opening positioned between the two or more fan portions and at least one of the first electrode and the second electrode encircling the expandable fluid region.

4. The artificial muscle chair device of claim 2, wherein:
   the two or more radially extending portions comprise two or more tab portions and two or more bridge portions;
   each of the two or more bridge portions interconnects adjacent tab portions; and
   at least one of the first electrode and the second electrode comprises a central opening positioned between the two or more tab portions and encircling the expandable fluid region.

5. The artificial muscle chair device of claim 1, wherein the plurality of artificial muscles are communicatively coupled to a controller.

6. The artificial muscle chair device of claim 5, further comprising a pressure sensor communicatively coupled to the controller, wherein the pressure sensor is configured to output a current pressure value to the controller and actuation of the electrode pair is based on the current pressure value.

7. The artificial muscle chair device of claim 6, wherein the current pressure value is utilized to detect an occupant of the artificial muscle chair device.

8. The artificial muscle chair device of claim 5, wherein actuation of the one or more artificial muscles comprises haptic feedback based upon output received at the controller from an infotainment device configured for use by an occupant of the artificial muscle chair device.

9. The artificial muscle chair device of claim 5, wherein actuation of the one or more artificial muscles comprises varying actuation based upon input received from an occupant of the artificial muscle chair device.

10. The artificial muscle chair device of claim 5, wherein the artificial muscle chair device resides in a vehicle.

11. The artificial muscle chair device of claim 10, wherein actuation of the one or more artificial muscles comprises haptic feedback based upon output received at the controller from the vehicle.

12. The artificial muscle chair device of claim 1, further comprising a layered actuation structure comprising one or more actuation platforms interleaved with one or more mounting platforms to form one or more actuation cavities therebetween, wherein at least one of the plurality of artificial muscles is disposed in the one or more actuation cavities and the layered actuation structure is embedded in the chair.

13. The artificial muscle chair device of claim 12 further comprising a plurality of layered actuation structures in which at least two layered actuation structures are independently operable.

14. The artificial muscle chair device of claim 12 further comprising a plurality of actuation cavities, wherein a plurality of artificial muscles are disposed within one or more of the plurality of actuation cavities.

15. The artificial muscle chair device of claim 1 further comprising one or more cooling elements, one or more heating elements, or combinations thereof.

16. A method for actuating an artificial muscle chair device, the method comprising:
- providing a voltage using a power supply electrically coupled to an electrode pair of each of a plurality of artificial muscles embedded in a chair, wherein:
- each artificial muscle comprises:
  - a housing having an electrode region and an expandable fluid region;
  - a first electrode and a second electrode each disposed in the electrode region of the housing;
  - a first electrical insulator layer fixed to a surface of the first electrode opposite the housing and extending across the electrode region and an entirety of the expandable fluid region; and
  - a dielectric fluid disposed within the housing;
- electrostatically attracting via the first and second electrodes;
- inflating the expandable fluid region with the dielectric fluid; and
- applying selective pressure to an outer surface of the chair.

17. The method of claim 16 further comprising a layered actuation structure comprising one or more actuation platforms interleaved with one or more mounting platforms to form one or more actuation cavities therebetween, wherein at least one of the plurality of artificial muscles is disposed in the one or more actuation cavities and the layered actuation structure is embedded in the chair.

18. The method of claim 16, wherein the one or more artificial muscles are communicatively coupled to a controller, the method further comprising:
- varying actuation based upon output received at the controller from an occupant of the artificial muscle chair device.

19. An artificial muscle vehicle chair device comprising:
- a plurality of artificial muscles embedded in a chair, where each artificial muscle comprises:
  - a housing having an electrode region and an expandable fluid region;
  - a first electrode and a second electrode each disposed in the electrode region of the housing; and
  - a dielectric fluid disposed within the housing, where the first and second electrodes are configured to electrostatically attract, inflating the expandable fluid region with the dielectric fluid and thereby applying selective pressure to the chair, wherein at least two of the plurality of artificial muscles are in different states of actuation at the same time;
- a plurality of independently operable layered actuation structures each comprising one or more actuation platforms interleaved with one or more mounting platforms to form one or more actuation cavities therebetween, wherein at least one of the plurality of artificial muscles is disposed in the one or more actuation cavities and the plurality of independently operable layered actuation structures are embedded in the chair; and
- a controller to which the plurality of artificial muscles are communicatively coupled, wherein the controller is configured to provide output to the plurality of artificial muscles to provide haptic feedback to an occupant of the artificial muscle vehicle chair device, wherein the artificial muscle vehicle chair device resides in a vehicle.

20. The artificial muscle vehicle chair device of claim 19 wherein:
- the occupant of the artificial muscle vehicle chair device is an operator of the vehicle; and
- the haptic feedback provided to the occupant of the artificial muscle vehicle chair device is based upon operation of the vehicle by the occupant of the artificial muscle vehicle chair device.

\* \* \* \* \*

UNITED STATES PATENT AND TRADEMARK OFFICE
CERTIFICATE OF CORRECTION

| | | |
|---|---|---|
| PATENT NO. | : 12,465,548 B2 | Page 1 of 1 |
| APPLICATION NO. | : 17/365267 | |
| DATED | : November 11, 2025 | |
| INVENTOR(S) | : Michael P. Rowe | |

It is certified that error appears in the above-identified patent and that said Letters Patent is hereby corrected as shown below:

In the Specification

In Column 2, Line(s) 41, after "structure", insert --having--.

In Column 4, Line(s) 53, delete "table," and insert --tablet,--, therefor.

In Column 5, Line(s) 57, after "region", insert --and--.

In Column 19, Line(s) 62, delete "cavity facing" and insert --cavity-facing--, therefor.

In the Claims

In Column 24, Line(s) 64, Claim 13, after "claim 12", insert --,--.

In Column 25, Line(s) 1, Claim 14, after "claim 12", insert --,--.

In Column 25, Line(s) 5, Claim 15, after "claim 1", insert --,--.

In Column 25, Line(s) 29, Claim 17, after "claim 16", insert --,--.

In Column 26, Line(s) 32, Claim 20, after "claim 19", insert --,--.

Signed and Sealed this
Thirtieth Day of December, 2025

John A. Squires
*Director of the United States Patent and Trademark Office*